US012610276B2

(12) United States Patent
Salahuddeen et al.

(10) Patent No.: US 12,610,276 B2
(45) Date of Patent: Apr. 21, 2026

(54) MULTI-CELL SCHEDULING WITH CARRIER AGGREGATION

(71) Applicant: Outdoor Wireless Networks LLC, Richardson, TX (US)

(72) Inventors: Irfaan Ahamed Salahuddeen, Acton, MA (US); Vagish Srinivasamurthy, Bangalore (IN); Purnima Venkata Kompella, Bangalore (IN); Naveen Shanmugaraju, Bangalore (IN)

(73) Assignee: Outdoor Wireless Networks LLC, Richardson, TX (US)

( * ) Notice: Subject to any disclaimer, the term of this patent is extended or adjusted under 35 U.S.C. 154(b) by 486 days.

(21) Appl. No.: 17/900,561

(22) Filed: Aug. 31, 2022

(65) Prior Publication Data

US 2023/0083390 A1 Mar. 16, 2023

(30) Foreign Application Priority Data

Sep. 15, 2021 (IN) .............................. 202121041740

(51) Int. Cl.
$H04W\ 72/12$ (2023.01)
$H04W\ 28/02$ (2009.01)
$H04W\ 80/02$ (2009.01)

(52) U.S. Cl.
CPC ....... *H04W 28/0278* (2013.01); *H04W 72/12* (2013.01); *H04W 80/02* (2013.01)

(58) Field of Classification Search
CPC . H04W 28/0278; H04W 72/12; H04W 80/02; H04W 28/065; H04W 72/52
See application file for complete search history.

(56) References Cited

U.S. PATENT DOCUMENTS

| | | | |
|---|---|---|---|
| 2010/0274915 A1 | 10/2010 | Ho et al. | |
| 2015/0305034 A1* | 10/2015 | Balachandran | ....... H04W 72/23 370/329 |
| 2016/0037550 A1* | 2/2016 | Barabell | .............. H04B 17/318 455/450 |
| 2018/0020500 A1* | 1/2018 | Pelletier | ........... H04W 72/1268 |

FOREIGN PATENT DOCUMENTS

KR 1020190015665 A 2/2019

OTHER PUBLICATIONS

International Searching Authority, "International Search Report and Written Opinion", from PCT Application No. PCT/US2022/042206, from Foreign Counterpart to U.S. Appl. No. 17/900,561, Dec. 14, 2022, pp. 1 through 12, Published in: KR.

* cited by examiner

*Primary Examiner* — Lakeram Jangbahadur
(74) *Attorney, Agent, or Firm* — Fogg & Powers LLC

(57) ABSTRACT

A base station includes at least one remote unit (RU) that exchanges radio frequency (RF) signals with a user equipment (UE) using an air interface. The base station also includes a controller communicatively coupled to the at least one RU. The controller forms first RLC protocol data units (PDUs) for a first cell and second RLC PDUs for a second cell based on Radio Link Control (RLC) service data units (SDUs). A first at least one processor in the controller performs first Medium Access Control (MAC) scheduling for the first cell based on a first buffer occupancy update to produce a first scheduling decision. A second at least one processor in the controller performs second MAC scheduling for the second cell based on a second buffer occupancy update to produce a second scheduling decision.

34 Claims, 11 Drawing Sheets

500

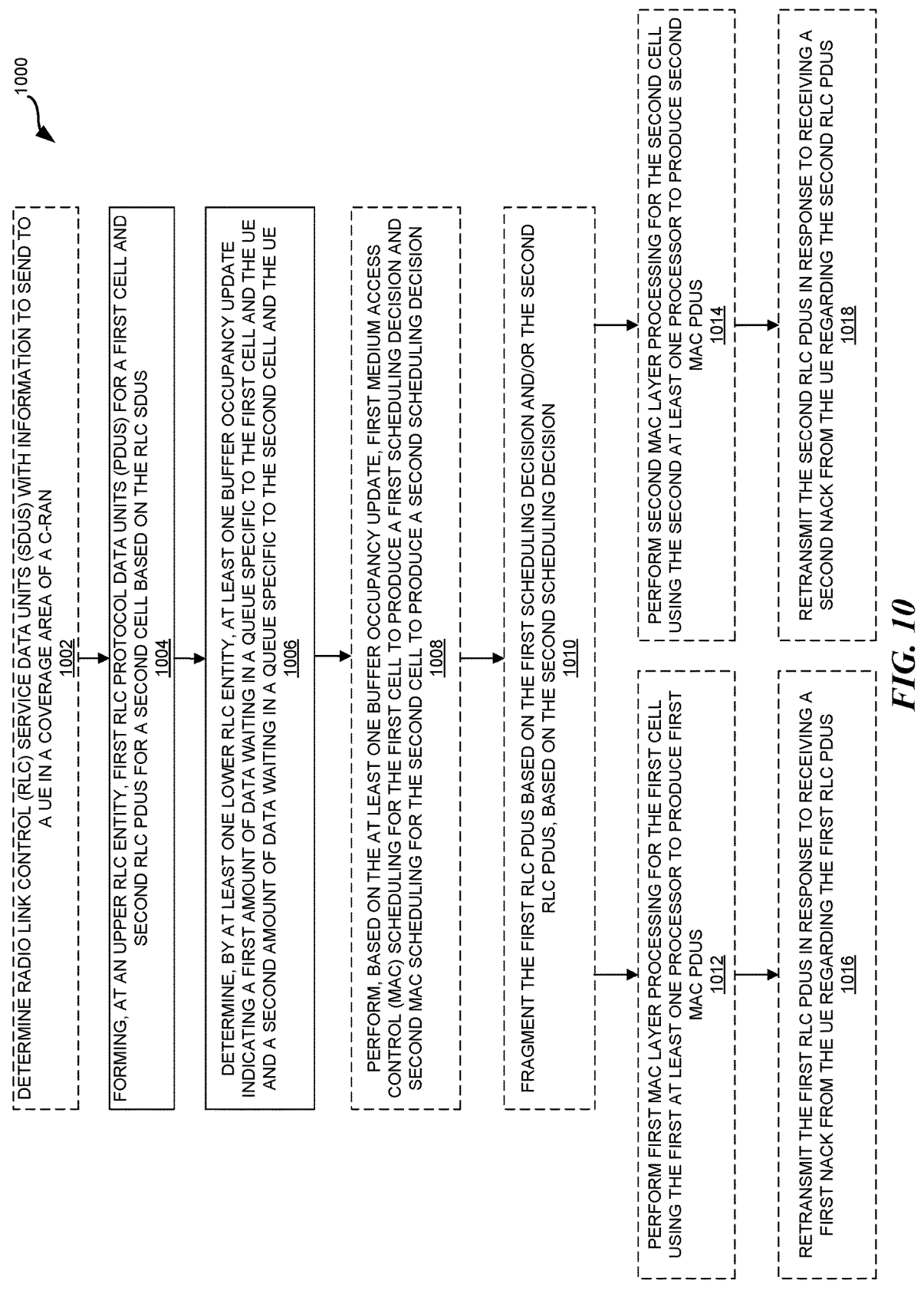

DETERMINE RADIO LINK CONTROL (RLC) SERVICE DATA UNITS (SDUS) WITH INFORMATION TO SEND TO A UE IN A COVERAGE AREA OF A C-RAN
1002

FORMING, AT AN UPPER RLC ENTITY, FIRST RLC PROTOCOL DATA UNITS (PDUS) FOR A FIRST CELL AND SECOND RLC PDUS FOR A SECOND CELL BASED ON THE RLC SDUS
1004

DETERMINE, BY AT LEAST ONE LOWER RLC ENTITY, AT LEAST ONE BUFFER OCCUPANCY UPDATE INDICATING A FIRST AMOUNT OF DATA WAITING IN A QUEUE SPECIFIC TO THE FIRST CELL AND THE UE AND A SECOND AMOUNT OF DATA WAITING IN A QUEUE SPECIFIC TO THE SECOND CELL AND THE UE
1006

PERFORM, BASED ON THE AT LEAST ONE BUFFER OCCUPANCY UPDATE, FIRST MEDIUM ACCESS CONTROL (MAC) SCHEDULING FOR THE FIRST CELL TO PRODUCE A FIRST SCHEDULING DECISION AND SECOND MAC SCHEDULING FOR THE SECOND CELL TO PRODUCE A SECOND SCHEDULING DECISION
1008

FRAGMENT THE FIRST RLC PDUS BASED ON THE FIRST SCHEDULING DECISION AND/OR THE SECOND RLC PDUS, BASED ON THE SECOND SCHEDULING DECISION
1010

PERFORM FIRST MAC LAYER PROCESSING FOR THE FIRST CELL USING THE FIRST AT LEAST ONE PROCESSOR TO PRODUCE FIRST MAC PDUS
1012

PERFORM SECOND MAC LAYER PROCESSING FOR THE SECOND CELL USING THE SECOND AT LEAST ONE PROCESSOR TO PRODUCE SECOND MAC PDUS
1014

RETRANSMIT THE FIRST RLC PDUS IN RESPONSE TO RECEIVING A FIRST NACK FROM THE UE REGARDING THE FIRST RLC PDUS
1016

RETRANSMIT THE SECOND RLC PDUS IN RESPONSE TO RECEIVING A SECOND NACK FROM THE UE REGARDING THE SECOND RLC PDUS
1018

MULTI-CELL SCHEDULING WITH CARRIER AGGREGATION

CROSS-REFERENCE TO RELATED APPLICATIONS

This application claims the benefit of Indian Provisional Patent Application Serial No. 202121041740 filed on Sep. 15, 2021, entitled "MULTI-CELL SCHEDULING WITH CARRIER AGGREGATION", the entirety of which is incorporated herein by reference.

BACKGROUND

Multicell operation and Carrier Aggregation are important features of wireless communication systems. Accordingly, a method is proposed herein to improve parallelism in the implementation of MAC Scheduler and 5G RLC entities to realize a high order of carrier aggregation.

SUMMARY

A base station includes at least one remote unit (RU) that exchanges radio frequency (RF) signals with a user equipment (UE) using an air interface. The base station also includes a controller communicatively coupled to the at least one RU. The controller forms first RLC protocol data units (PDUs) for a first cell and second RLC PDUs for a second cell based on Radio Link Control (RLC) service data units (SDUs). A first at least one processor in the controller performs first Medium Access Control (MAC) scheduling for the first cell based on a first buffer occupancy update to produce a first scheduling decision. A second at least one processor in the controller performs second MAC scheduling for the second cell based on a second buffer occupancy update to produce a second scheduling decision.

A base station includes at least one remote unit (RU) that exchanges radio frequency (RF) signals with a user equipment (UE) using an air interface. The base station also includes a controller communicatively coupled to the at least one RU. The controller forms, at an upper RLC entity, first RLC protocol data units (PDUs) for a first cell and second RLC PDUs for a second cell based on Radio Link Control (RLC) service data units (SDUs). The controller also determines, by at least one lower RLC entity, at least one buffer occupancy update indicating a first amount of data waiting in a queue specific to the first cell and the UE and a second amount of data waiting in a queue specific to the second cell and the UE.

DRAWINGS

Understanding that the drawings depict only exemplary configurations and are not therefore to be considered limiting in scope, the exemplary configurations will be described with additional specificity and detail using the accompanying drawings, in which:

FIG. 10 is a flow diagram illustrating a method for the third example implementation of multi-cell scheduling in carrier aggregation (CA).

Figure 1A:
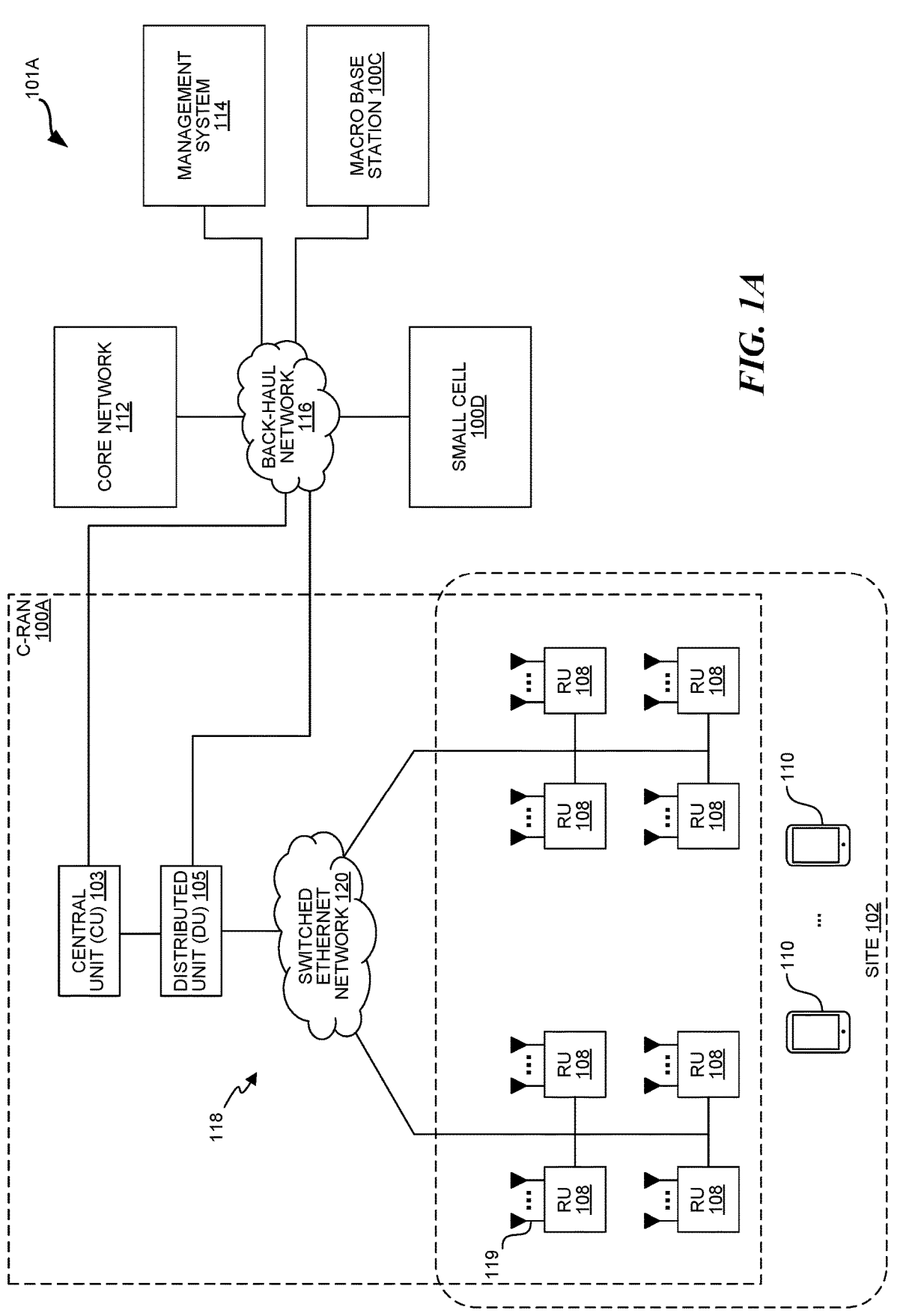
FIG. 1A is a block diagram illustrating one exemplary embodiment of a system in which the techniques described here for multi-cell scheduling with Carrier Aggregation (CA) can be used.

In accordance with common practice, the various described features are not drawn to scale but are drawn to emphasize specific features relevant to the exemplary configurations.

DETAILED DESCRIPTION

Typically, LTE systems have a maximum carrier bandwidth of 20 MHz. Alternatively, the Fifth Generation New Radio (5G NR) wireless interface uses radio frequency (RF) ranges, Frequency Range 1 ("FR1") in the sub 6 Gigahertz (GHz) frequency range and/or Frequency Range 2 ("FR2") ranging from 24 GHz to 40 or 100 GHz. For example, 5G NR systems using FR1 may have a maximum bandwidth of about 100 MHz.

For a given carrier bandwidth, the throughput for a given user equipment (UE) is limited based on various factors, e.g., the signal-to-interference-plus-noise ratio (SINR), how many multiple-input-multiple-output (MIMO) layers are in use, etc. To enhance single UE throughput beyond the limit imposed by these factors, Carrier Aggregation (CA) may be employed where multiple carriers with different bandwidths/ radio frequencies are combined when an eNodeB communicates with a UE, which increases the UE's peak throughput. In some configurations, network operators can use CA to combine their disjointed licensed spectrum, e.g., to create intra-band or inter-band CA operation intra-band or intra-band CA.

Distributed radio access networks (RANs) (in which multiple radio frequency (RF) units in a system communicate with UEs) may provide a variety of benefits, e.g., increasing diversity of wireless signals communicated between the RAN and the UE. For example, a Third Generation Partnership Project (3GPP) Fourth Generation (4G) cloud RAN (C-RAN) will include multiple devices (e.g., baseband controller unit(s), remote units (RUs), RF units (antenna arrays)) interfaced together to enable and implement RAN functions. In a 5G C-RAN, there may be further logical and/or physical splits in the devices (e.g., central unit(s) (CU(s)), distributed unit(s) (DU(s)), remote units (RUs), RF units (antenna arrays)), which are interfaced together to enable and implement RAN functions.

When distributed RANs, such as a 4G or 5G C-RAN, implement carrier aggregation, they typically use a single monolithic RLC processing entity and a single Medium Access Control (MAC) scheduler to implement RLC and MAC scheduling for all carriers, respectively. However, using a single monolithic MAC scheduler increases the single undivided CPU requirement, e.g., it could require X Million instructions per second (MIPS) per scheduling interval for 4-carrier CA. This is because the processing cycles for scheduling grows with the number of carriers to be aggregated. Since the MAC scheduling is part of the real-time context during which the RLC encoder has to wait for the full MAC scheduling decision (SD) before forming RLC Protocol Data Units (PDUs), the monolithic MAC scheduler can become a processing bottleneck (or limiting factor) in the implementation of Carrier Aggregation, especially when the number of carriers to be aggregated is high.

Accordingly, the present systems and methods parallelize portions of the Layer 2 processing within the RAN. Specifically, the DL RLC processing can be divided into a single DL upper RLC entity and N lower RLC entities (one for each carrier). The MAC scheduler can also be divided into a separate MAC scheduler for each carrier. This parallelization of lower RLCs and MAC schedulers means that the RLC PDU formation doesn't have to wait for the full MAC scheduling decision as is the case with a single RLC entity and a single MAC scheduler. In other words, this separation of RLC and MAC entities allows for parallelization and removes the computational/processing bottleneck imposed by their monolithic counterparts.

As used herein, the term "entity" (e.g., "RLC entity") can refer to processing performed by hardware, software, or a combination of both. Thus the term "entity" and "processing" may be used interchangeably herein. Two entities can be implemented in the same physical device or different physical devices. For example, if a 5G Distributed Unit (DU) implements two lower RLC entities, those RLC entities could be implemented in the same computing device (e.g., server) or different computing devices (e.g., servers). Similarly, two entities can be implemented in the same processor or processing core or different processors or processing cores within the same physical housing.

Example 5G System

FIG. 1A is a block diagram illustrating one exemplary embodiment of a system 101A in which the techniques described here for multi-cell scheduling with Carrier Aggregation (CA) can be used. The system 101A includes at least one base station 100A-D.

The term "base station" 100 herein refers to any electronic device configured to receive and transmit RF signals in order to provide wireless service to user equipment (UEs) 110. Typically, base stations 100 are in a fixed location, however other configurations are possible. Similarly, a base station 100A-D can be implemented in a single physical housing/location or multiple physical housings/locations. Without limitation, types of base stations include a cloud radio access network (C-RAN) 100A, a small cell 100D, a macro base station 100C, etc. Small cells 100D are generally lower-power, shorter-range, and can serve fewer max concurrent users than macro base stations 100C. For example, small cell(s) 100D may be used to fill in coverage gaps in macro base station 100C coverage, e.g., indoors, in urban environments, etc. In some cases, a C-RAN 100A may be considered a type of small cell 100D (and therefore, a type of base station 100A-D).

A cloud RAN (C-RAN) 100A architecture employs the following logical nodes: at least one central unit (CU) 103, at least one distributed unit (DU) 105, and multiple radio units (RUs) 108. Each RU 108 is remotely located from each CU 103 and DU 105 serving it. Also, in this exemplary embodiment, at least one of the RUs 108 is remotely located from at least one other RU 108 serving that site. In some configurations, DU(s) 105 can optionally be collocated in the same physical housing as CU(s) 103 or an RU 108 and optionally implemented using the same processor(s).

Additionally, while described as being implemented in the DU 105 of a C-RAN 100A, it is understood that the present systems and methods can be implemented in any type of base station 100A-D, e.g., C-RAN 100A-B, other small cell 100D, a macro base station 100C, and/or a distributed antenna system (DAS) (not shown).

The RUs 108 and UEs 110 connected to (e.g., provided wireless service by) the C-RAN 100A may be located at a site 102. The site 102 may be, for example, a building or campus or other grouping of buildings (used, for example, by one or more businesses, governments, other enterprise entities) or some other public venue (such as a hotel, resort, amusement park, hospital, shopping center, airport, university campus, arena, or an outdoor area such as a ski area, stadium or a densely-populated downtown area). For example, the site 102 may be at least partially indoors, but other alternatives are possible. In some configurations, the CU(s) 103 and/or DU(s) 105 in the C-RAN 100A may not be physically present at the site.

The C-RAN 100A can be implemented in accordance with one or more public standards and specifications. In some configurations, the C-RAN 100A is implemented using the logical RAN nodes, functional splits, and fronthaul interfaces defined by the O-RAN Alliance. In such an O-RAN example, each CU 103, DU 105, and RU 108 can be implemented as an O-RAN central unit (CU), O-RAN distributed unit (DU), and O-RAN radio unit (RU), respectively, in accordance with the O-RAN specifications. That is, each CU 103 comprises a logical node hosting Packet Data Convergence Protocol (PDCP), Radio Resource Control (RRC), Service Data Adaptation Protocol (SDAP), and other control functions. In some configurations, each DU 105 comprises a logical node hosting Radio Link Control (RLC), and Media Access Control (MAC) layers as well as the upper or higher portion of the Physical (PHY) layer (where the PHY layer is split between the DU 105 and RU 108). Each RU 108 comprises a logical node hosting the portion of the PHY layer not implemented in the DU 105 (that is, the lower portion of the PHY layer) as well as implementing the basic RF and antenna functions.

Although the CU 103, DU 105, and RUs 108 are described as separate logical entities, one or more of them can be implemented together using shared physical hardware and/or software. For example, in the exemplary embodiment shown in FIG. 1A, for each site, the CU 103 and DU 105 serving that site could be physically implemented together using shared hardware and/or software, whereas each RU 108 would be physically implemented using separate hardware and/or software.

In some configurations, an individual CU 103 or DU 105 may be implemented across different physical devices. For example, a single DU 105 could be implemented using multiple (e.g., physically-separated) computing devices (each with their own processor(s) and memory device(s), such as servers), which may be communicatively coupled to each other, at least one CU 103, and/or a plurality of RUs 108. Additionally or alternatively, an individual CU 103 or DU 105 may be implemented across multiple processors within the same computing device/server.

Figure 1B:
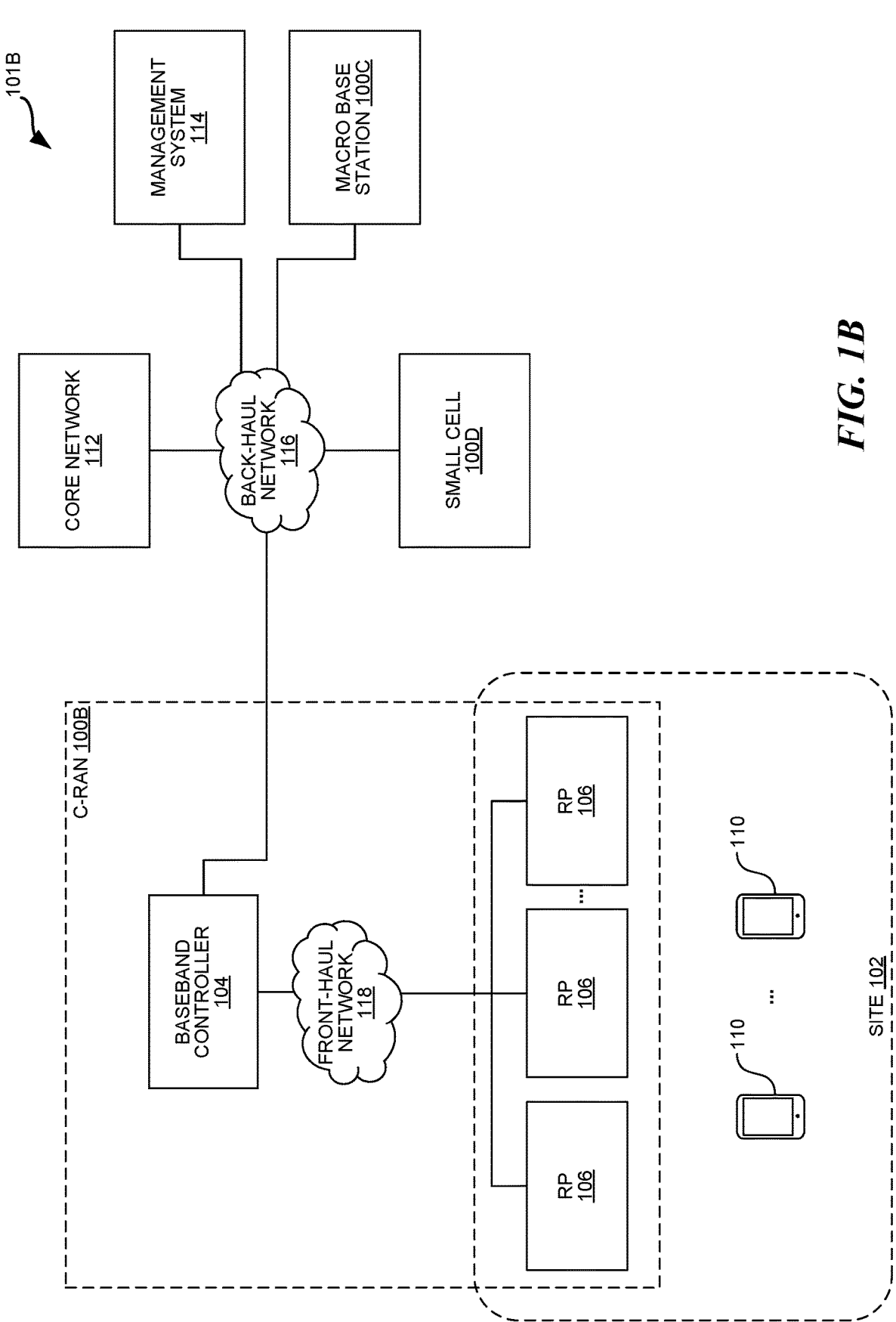
FIG. 1B is a block diagram illustrating another exemplary embodiment of a system in which the techniques described here for multi-cell scheduling with Carrier Aggregation (CA) can be used.

It should be noted that a C-RAN 100A may implement multiple cells. For example, a single DU 105 can manage multiple cells in a 5G system (or a single baseband controller 104 can manage multiple cells in a 4G system as illustrated in FIG. 1B). For multi-cell scenarios, the cells under DU 105 in 5G (or the baseband controller 104 in 4G) can have (1) different PCIs; or (2) the same PCI if different carrier frequencies are used across the multiple cells. In a configuration where a single DU 105 (or a single baseband controller 104) implements multiple cells, each of the RUs 108 may still belong to each of the multiple cells.

Also, in the exemplary embodiment described here in connection with FIG. 1A, the C-RAN 100A is implemented as a Fifth Generation New Radio (5G NR) RAN that supports a 5G NR wireless interface in accordance with the 5G NR specifications and protocols promulgated by the 3rd Generation Partnership Project (3GPP). Thus, in some configurations, the C-RAN 100A can also be referred to as a "Next Generation Node B" 100, "gNodeB" 100, or "gNB" 100.

Each RU 108 includes or is coupled to one or more antennas 119 via which downlink RF signals are radiated to various items of user equipment (UE) and via which uplink RF signals transmitted by UEs 110 are received.

The CU 103 and/or DU(s) 105 is/are coupled to a core network 112 of the associated wireless network operator over an appropriate back-haul network 116 (such as the Internet). Also, each DU 105 is communicatively coupled to the RUs 108 served by it using a front-haul network 118. Each of the DU(s) 105 and RUs 108 include one or more network interfaces (not shown) to enable the DU(s) 105 and RUs 108 to communicate over the front-haul network 118.

In one implementation, the front-haul 118 that communicatively couples the DU(s) 105 to the RUs 108 is implemented using a switched ETHERNET network 120. In such an implementation, each DU 105 and RU 108 includes one or more ETHERNET interfaces for communicating over the switched ETHERNET network 120 used for the front-haul 118. However, it is to be understood that the front-haul 118 between each DU 105 and the RUs 108 served by it can be implemented in other ways.

Each CU 103, DU 105, and RU 108, (and the functionality described as being included therein), as well as any other device in the system 101A more generally, and any of the specific features described here as being implemented by any of the foregoing, can be implemented in hardware, software, or combinations of hardware and software, and the various implementations (whether hardware, software, or combinations of hardware and software) can also be referred to generally as "circuitry" or a "circuit" or "circuits" configured to implement at least some of the associated functionality. When implemented in software, such software can be implemented in software or firmware executing on one or more suitable programmable processors or configuring a programmable device (for example, processors or devices included in or used to implement special-purpose hardware, general-purpose hardware, and/or a virtual platform). Such hardware or software (or portions thereof) can be implemented in other ways (for example, in an application specific integrated circuit (ASIC), etc.). Also, the RF functionality can be implemented using one or more RF integrated circuits (RFICs) and/or discrete components.

As noted above, in the exemplary embodiment described here in connection with FIG. 1A, the C-RAN 100A is implemented as a 5G NR RAN that supports a 5G NR wireless interface to wirelessly communicate with the UEs 110. In the exemplary embodiment described here in connection with FIG. 1A, the 5G NR wireless interface may support the use of beamforming for wirelessly communicating with the UEs 110 in both the downlink and uplink directions using the millimeter wave (mmWave) radio frequency (RF) range defined for 5G NR (Frequency Range 2 or "FR2"), e.g., ranging from 24 GHz to 40 or 100 GHz. 5G NR RAN systems typically make use of fine beams and beamforming, especially when FR2 is used. To perform such beamforming, each RU 108 comprises an array of multiple, spatially separated antennas 119. When FR2 is used, the spacing of the antennas 119 in the array is on the order of several millimeters (as opposed to several centimeters as is the case when FR1 is used) and can be implemented in a convenient fashion.

A management system 114 may be communicatively coupled to the CU 103, for example, via the back-haul network 116. The management system 114 may send and receive management communications to and from the CU 103, which in turn forwards relevant management communications to and from the RUs 108. Additionally, the management system 114 may assist in managing and/or configuring the base stations 100. The management system 114 may be communicatively coupled to the CU(s) 103, DU(s) 105, and RUs 108, for example, via the back-haul network 116 and/or the front-haul network 118. A hierarchical architecture can be used for management-plane ("M-plane") communications. When a hierarchical architecture is used, the management system 114 can send and receive management communications to and from the baseband controller 104, which in turn forwards relevant M-plane communications to and from the RUs 108 as needed. A direct architecture can also be used for M-plane communications. When a direct architecture is used, the management system 114 can communicate directly with the RUs 108 (without having the M-plane communications forwarded by the CU 103 or DU 105). A hybrid architecture can also be used in which some M-plane communications are communicated using a hierarchical architecture and some M-plane communications are communicated using a direct architecture. Proprietary protocols and interfaces can be used for such M-plane communications. Also, protocols and interfaces that are specified by standards such as O-RAN can be used for such M-plane communications.

Additionally, in some configurations (not shown in the Figures), at least partial DU 105 functionality and RU 108 functionality described herein can be implemented in the same physical housing. In such configurations, each DU/RU combination device may implement the RF and L1 functionality, and at least some L2 functionality (e.g., lower RLC functions and DL MAC functions such as scheduling, HARQ, and/or PDU formation). In such configurations, the upper RLC processing (discussed below) and higher processing (e.g., PDCP processing) is implemented in a physically separate CU 103 that is communicatively coupled to the DU/RU combination device(s).

Example 4G System

FIG. 1B is a block diagram illustrating another exemplary embodiment of a system 101B in which the techniques described here for multi-cell scheduling with Carrier Aggregation (CA) can be used. FIG. 1B includes a C-RAN 100B implementing an 3GPP Fourth Generation (4G) air interface, whereas the C-RAN 100A in FIG. 1A implements a 5G air interface. However, it should be noted that a C-RAN 100A-B, or a system 101 more generally, may implement 4G and 5G air interfaces.

The C-RAN 100B in FIG. 1B includes one or more baseband units (called baseband controller(s) 104) that interact with multiple radio points (RPs) 106. Each baseband controller 104 is coupled to the RPs over front-haul communication links or a front-haul network. Each RP 106 may include or be coupled to at least one antenna via which downlink RF signals are radiated to UEs 110 and via which uplink RF signals transmitted by UEs 110 are received. Furthermore, where an action is described as performed by a C-RAN 100B, it may be performed in the baseband controller 104 and/or at least one RP 106.

It should be noted that the baseband controller 104 may or may not be located at the site 102 (with the RPs 106). For example, the baseband controller 104 may be physically located remotely from the RPs 106 (and the site 102) in a centralized bank of baseband controllers 104. Additionally, the RPs 106 are preferably physically separated from each other within the site 102, although they are each communicatively coupled to the baseband controller 104.

Each UE 110 may be a computing device with at least one processor that executes instructions stored in memory, e.g., a mobile phone, tablet computer, mobile media device, mobile gaming device, laptop computer, vehicle-based computer, a desktop computer, etc. It should be noted that any number of UEs 110 (e.g., 1-1,000) may be present at the site 102.

The C-RAN 100B may be coupled to the core network 112 of each wireless network operator over an appropriate back-haul network 116. For example, the Internet (or any other ETHERNET network) may be used for back-haul. However, it is to be understood that the back-haul network 116 can be implemented in other ways.

In some configurations, the system 101 may be implemented as a Long Term Evolution (LTE) radio access network providing wireless service using an LTE air interface. In the LTE configuration, the baseband controller 104 and RPs 106 together (C-RAN 100B) may be used to implement an LTE Evolved Node B (also referred to here as an "eNodeB" or "eNB"). An eNodeB may be used to provide UEs 110 with mobile access to the wireless network operator's core network 112 to enable UE 110 to wirelessly communicate data and voice (using, for example, Voice over LTE (VoLTE) technology).

In an LTE configuration, each core network 112 may be implemented as an Evolved Packet Core (EPC) 112 comprising standard LTE EPC network elements such as, for example, a mobility management entity (MIME) and a Serving Gateway (SGW) and, optionally, a Home eNodeB gateway (HeNodeB GW) (not shown) and a Security Gateway (SeGW) (not shown).

Moreover, in an exemplary LTE configuration, the baseband controller 104 may communicate with the MME and SGW in the EPC core network 112 using the LTE S1 interface and communicates with eNodeBs using the LTE X2 interface. For example, the baseband controller 104 can communicate with a macro base station via the LTE X2 interface.

The baseband controller 104 and RPs 106 can be implemented to use an air interface that supports one or more of frequency-division duplexing (FDD) and/or time-division duplexing (TDD). Also, the baseband controller 104 and the RPs 106 can be implemented to use an air interface that supports one or more of the multiple-input-multiple-output (MIMO), single-input-single-output (SISO), and/or beam forming schemes. For example, the baseband controller 104 and the RPs 106 can implement one or more of the LTE transmission modes. Moreover, the baseband controller 104 and the RPs 106 can be configured to support multiple air interfaces and/or to support multiple wireless operators.

In some configurations, the front-haul network 118 that communicatively couples each baseband controller 104 to the one or more RPs 106 is implemented using a standard ETHERNET network. However, it is to be understood that the front-haul network 118 between the baseband controller 104 and RPs 106 can be implemented in other ways. The front-haul network 118 may be implemented with one or more switches, routers, and/or other networking devices.

Data can be front-hauled between the baseband controller 104 and RPs 106 in any suitable way (for example, using front-haul interfaces and techniques specified in the Common Public Radio Interface (CPRI) and/or Open Base Station Architecture Initiative (OBSAI) family of specifications).

The Third Generation Partnership Project (3GPP) has adopted a layered model for the LTE radio access interface. Generally, the baseband controller 104 and/or RPs 106 perform analog radio frequency (RF) functions for the air interface as well as digital Layer-1 (L1), Layer-2 (L2), and/or Layer-3 (L3), of the 3GPP-defined LTE radio access interface protocol, functions for the air interface. In some configurations, the Layer-1 processing for the air interface may be split between the baseband controller 104 and the RPs 106, e.g., with L2-L3 functions for the air interface being performed at the baseband controller 104.

Where functionality of a 5G CU 103 or 5G DU 105 is described herein, it may also equally apply to a baseband controller 104 in 4G configurations. Similarly, where functionality of a 5G radio unit (RU) 108 is described herein, it may also be implemented an RP 106 in 4G configurations.

First Example Implementation of Multi-Cell
Scheduling in Carrier Aggregation

Figure 2:
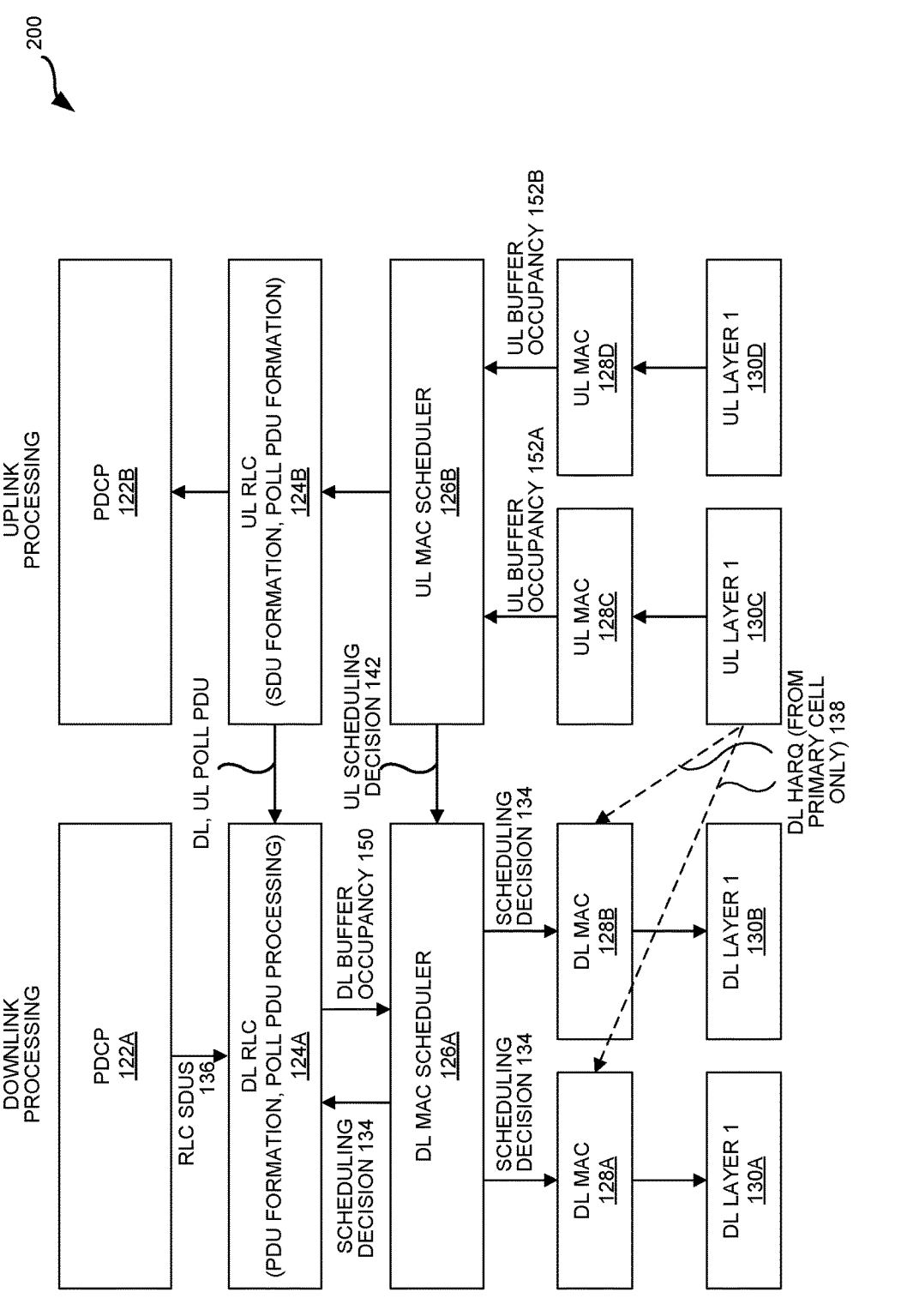
FIG. 2 is a block diagram illustrating a first example implementation of multi-cell scheduling in carrier aggregation (CA)

FIG. 2 is a block diagram illustrating a first example implementation 200 of multi-cell scheduling in carrier aggregation (CA), e.g., in a C-RAN 100A-B. Typically, all 3GPP Layer-2 (L2) processing for a C-RAN 100A-B is collocated together because CA demands low latency communication between the different processing units. For example, the L2 processing for a C-RAN 100A-B may take place in a single DU 105 in 5G (or a single baseband controller 104 in 4G), e.g., that implements multiple cells. In multi-cell CA, each cell may map to a different carrier. In some configurations, data from any or all bearers can go on any, some, or all component carriers.

FIG. 2 illustrates the downlink (DL) processing on the left side and the uplink (UL) processing on the right side. Additionally, while some information is shown as being passed between entities in FIG. 2, this should not be viewed as limiting what information is passed. Furthermore, other connections can also be made between entities not shown in FIG. 2. Additionally, downlink and uplink entities that correspond to each other may be implemented in the same processor or processor core, e.g., the DL MAC scheduler 126A may be implemented in the same entity as the UL MAC scheduler 126B, etc.

In FIG. 2, the Packet Data Convergence Protocol (PDCP) and Radio link control (RLC) processing may be performed by a PDCP entity 122A and a DL RLC entity 124A, e.g., implemented in the same or separate processors within the same or different physical servers. In some configurations, the PDCP entity 122A is implemented in a CU 103 and the (combined DL & UL) RLC entity 124A-B is implemented in a DU 105.

Figure 3:
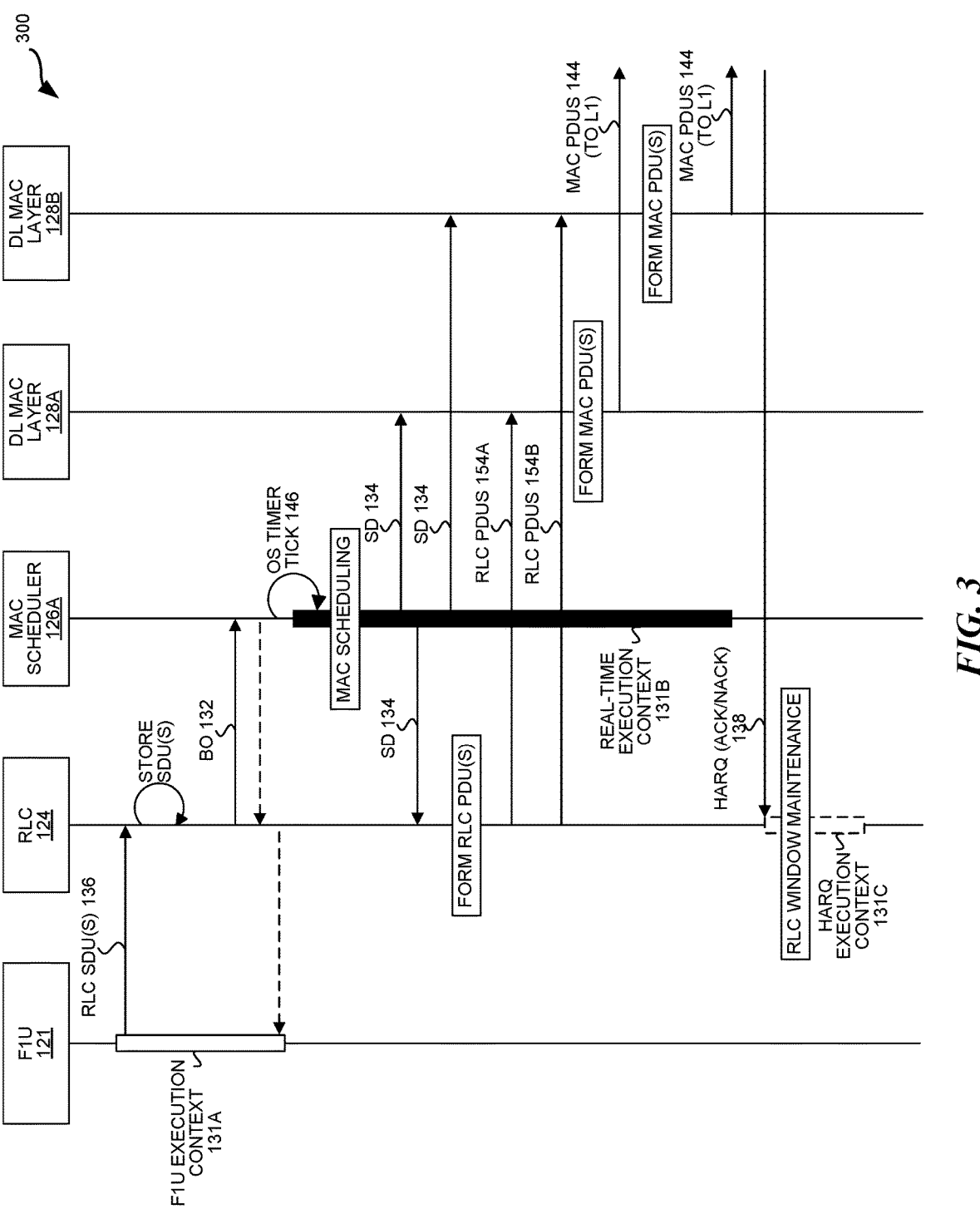
FIG. 3 is a sequence diagram illustrating the first example implementation of multi-cell scheduling in carrier aggregation (CA)

FIG. 3 is a sequence diagram illustrating the first example implementation 200, 300 of multi-cell scheduling in carrier aggregation (CA), e.g., in a C-RAN 100A-B. Specifically, FIG. 3 corresponds to and further describes the DL L2 processing outlined in FIG. 2.

First example implementation 200, 300, the PDCP entity 122A sends RLC Service Data Units (SDUs) to the RLC entity 124A. While not shown in FIG. 2, a transparent F1U layer 121 may be present between the between the PDCP entity 122A and the DL RLC entity 124A to ensure that they can be disaggregated in two different places. For example, the PDCP entity 122A-B could be implemented in a CU 103 and the RLC entity 124A-B implemented in a DU 105 in a 5G C-RAN 100A.

Upon receiving the RLC SDUs 136, the RLC entity 124 may store the SDUs in the appropriate queue(s). A given UE 110 may have multiple bearers (e.g., tunnels to the Internet) in CA and each bearer for a UE 110 has a separate queue at the RLC entity 124. So the RLC entity 124 may operate on a per-bearer basis, while the MAC scheduler 126A and DL MAC layers 128A-B may operate on a per-UE basis in the first example implementation 200, 300 of multi-cell CA (the UL MAC scheduler 126B and UL MAC layers 128C-D may also operate on a per-UE basis in the first example implementation 200, 300). A single DL RLC entity 124A is used for all carriers in the first example implementation 200, 300 of multi-cell scheduling in CA.

Then, the RLC entity 124 may send a DL MAC buffer occupancy update (BO) 150 to the MAC scheduler 126A. The DL MAC buffer occupancy update (BO) 150 indicates how much data is still pending in that particular bearer queue for a particular UE 110. For example, the DL MAC buffer occupancy update 150 can indicate, for a given bearer, the total (or differential) data that is pending in the bearer queue for the UE 110. For example, if the DL MAC buffer occupancy update 150 indicates the total data, assuming 10 packets of 1000 bytes each are pending in the bearer queue, the DL MAC buffer occupancy update 150 will indicate 10,000 bytes are pending. Alternatively, if 10,000 bytes are pending in the bearer queue and the previous DL MAC buffer occupancy update 150 indicated 9,000 bytes pending, the DL MAC buffer occupancy update 150 could indicate 1,000 bytes pending as a differential from the previous DL MAC buffer occupancy update 150 for the bearer. In contrast, UL buffer occupancy updates 152A-B can indicate how much data (absolute or differential) is pending in a particular bearer queue at the UE 110.

In response to an OS timer tick 146A-B (e.g., occurring at the beginning of the real-time execution context 131B represented by the solid black vertical bar in FIG. 3), the MAC scheduler 126A may wake up and perform MAC scheduling for all of the carriers of the UE 110, indicated by the DL MAC buffer occupancy update 150. The MAC scheduling may also use a UL scheduling decision 142 from the UL MAC scheduler 126B. A single DL MAC scheduler 126A handles scheduling for all (e.g., 2, 4, etc.) end carriers in the first example implementation 200, 300 of multi-cell scheduling in CA. So, this is a single F1U execution context 131A (solid vertical bar with white fill in FIG. 3) whenever the RLC SDUs 136 are being formed.

After the MAC scheduling is completed, the MAC scheduler 126A may send a scheduling decision (SD) 134 (e.g., the different scheduling positions for data that needs to be transmitted to the UE 110) to the different MAC layers 128A-B it is scheduling for and to the RLC entity 124. In some configurations, the scheduling decision 134 will itself indicate how many layers are being scheduling for each carrier.

Based on the scheduling indication received from the MAC scheduler 126, the RLC entity 124 may form RLC PDUs 154A-B and sends them to the individual MAC layers 128A-B. The scheduling decision 134 may provide the total size of all RLC PDUs 154A-B to be formed for that scheduling occasion. Each RLC SDU 136 forms one RLC PDU 154A-B. The RLC entity 124 needs to put together several RLC PDUs 154A-B such that their total size is equal to the size indicated in scheduling decision 134. This may include RLC PDU 154A-B segmentation discussed below. In response to the scheduling decision 134, the RLC entity 124 may provide 0 or 1 or more full RLC PDUs 154A-B, and 0 or 1 or RLC fragments.

Each RLC SDU 136 is assigned a different sequence number (SN) in 5G NR, which is different than LTE. Suppose the RLC entity 124 has a 1,500-byte packet it needs to send to the UE 110, but the MAC scheduler 126A allocated 300 bytes in the scheduling decision 134. In this case, the RLC entity 124 is supposed to fragment the 1,500 bytes into a single 300-byte packet with a single SN and that packet is sent to the MAC layers 128A-B. The RLC entity 124 may add fragmentation headers to subsequent packets that include the remainder of the original 1,500 bytes so that the UE 110 can eventually reconstruct the original 1,500 bytes.

Upon receiving the RLC PDUs 154A-B, the MAC layers 128A-B form MAC PDUs 144 from the RLC PDUs 154A-B and may add other MAC control information to the MAC PDUs 144. The MAC layers 128A-B then send the MAC PDUs 144 to the L1 processing entit(ies) 130A-B.

In parallel, there is a HARQ (ACK/NACK) execution context 131C (dashed vertical bar with white fill in FIG. 3) happening in the first example implementation 200, 300 of multi-cell scheduling in CA. In RLC acknowledged mode (AM), the data is transmitted from the RU(s) 108 to the UE 110 and the UE 110 sends DL HARQ 138 (an acknowledgment (ACK) or non-acknowledgment (NACK)) back, which is also processed by the RLC entity 124. If the HARQ 138 is an ACK, the RLC entity 124 moves the RLC window. If the HARQ 138 is a NACK, the RLC initiates a retransmission of the data not received (not shown in FIG. 3). In contrast to acknowledged RLC mode, unacknowledged RLC mode does not use ARQ but still uses an RLC window.

There are several advantages of using the first example implementation 200, 300 of multi-cell carrier aggregation (monolithic RLC entity 124 and MAC scheduler 126). First, the MAC scheduler 126A has an absolute idea of all the radio bearers of all the UEs 110 connected in the system, so it can perform MAC scheduling in a fair and efficient way. Second, the RLC entity 124 informs one buffer occupancy report per bearer to MAC scheduler 126, which makes the complete load for each bearer available to the MAC scheduler 126A at the time of scheduling decision 134. Thus the second advantage is simplicity and completeness and accuracy of data for scheduling.

There are also several disadvantages of using the first example implementation 200, 300 of multi-cell carrier aggregation. First, having a single monolithic MAC scheduler 126A increases the single undivided CPU requirement since the MAC scheduler 126A must meet real-time constraints while scheduling for multiple carriers. For example, it requires 1000 MIPS per scheduling interval for 4-carrier aggregation. Second, the single RLC entity 124 takes time to encode the RLC PDUs 154A-B for all carriers after the MAC scheduling is done.

Figure 4:
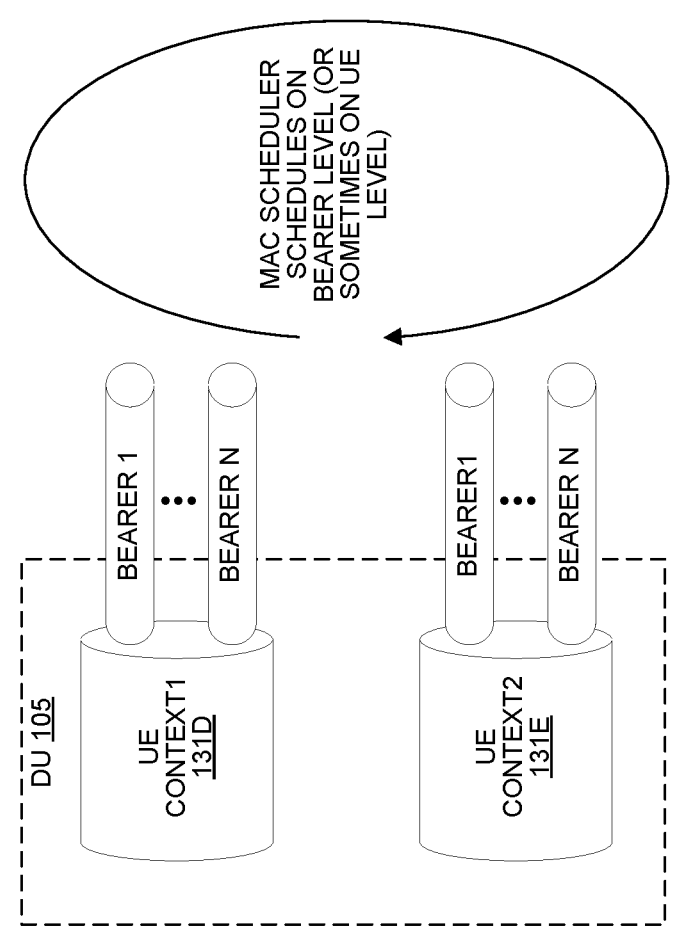
FIG. 4 is a block diagram that illustrates UE execution contexts being scheduled in a DU in a 5G C-RAN.

FIG. 4 is a block diagram that illustrates UE execution contexts 131D-E being scheduled in a DU 105 in a 5G C-RAN 100A. The scenarios shown illustrate N bearers associated with each UE context 131D-E. It is understood that the scenarios may also apply to UE contexts 131D-E executed in a baseband controller 104 of a 4G C-RAN 100B.

As noted above, a given UE 110 may have multiple bearers (e.g., tunnels to the Internet) in CA and each bearer has a separate queue at the RLC entity 124. So the RLC entity 124 operates on a per-bearer basis. The MAC scheduler 126A can schedule on a bearer (UE) level.

In the first example implementation 200, 300, the MAC scheduler 126A makes a decision about how much data to schedule on different bearers for different UEs 110 should be taken up for transmission based on complete (non-distributed) information it has.

In contrast, as will be seen from the description below, data is distributed in a second and third example implementations from a DL upper RLC entity to lower RLC entities. Hence the information about the amount of data available on each bearer gets distributed to lower RLC entities. Lower RLCs entit(ies) update their respective amounts to their respective carrier-specific MAC schedulers. MAC scheduler (s) then make decision on the per-carrier data that is thus made available. Additionally or alternatively, each carrier-specific MAC scheduler in the second example implementation may be informed about the full-bearer BO (sum across all carriers), which may come at the expense of delay and addition message exchanges.

Second Example Implementation of Multi-Cell Carrier Aggregation

Figure 5:
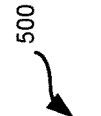
FIG. 5 is a block diagram illustrating a second example implementation of multi-cell carrier aggregation.

FIG. 5 is a block diagram illustrating a second example implementation 500 of multi-cell carrier aggregation. In comparison to 4G, the RLC processing in 5G enables some aspects of RLC processing to be performed asynchronously.

Like the first example implementation 200, 300, the processing shown in FIG. 5 may be performed by a single controller (e.g., a DU 105 in 5G) that implements multiple cells (and a different carrier for each cell) for a base station 100A-D, e.g., the single controller can be implemented by the combination of multiple physically-separate computing devices. It is understood that the present systems and methods can be implemented in the controller of any type of base station 100A-D, e.g., C-RAN 100A-B, other small cell 100D, a macro base station 100C, and/or a distributed antenna system (DAS) (not shown).

Although only two lower RLC entities 127A-B, DL MAC entities 129A-B, and DL layer 1 entities 130A-B are shown in FIG. 5, there can be N of each, where each one processes for a different cell and carrier of N cells and N carriers. As noted above, each cell may map to a different carrier in multi-cell CA. In some configurations, data from any or all bearers can go on any, some, or all component carriers.

FIG. 5 illustrates the downlink (DL) processing on the left side and the uplink (UL) processing on the right side. Additionally, while some information is shown as being passed between entities in FIG. 5, this should not be viewed as limiting what information is passed. Furthermore, other connections can also be made between entities not shown in FIG. 5. Additionally, downlink and uplink entities that correspond to each other may be implemented in the same processor or processor core, e.g., the DL PDCP entity 122A may be implemented in the same entity as the UL PDCP entity 122B, etc.

Figure 6:
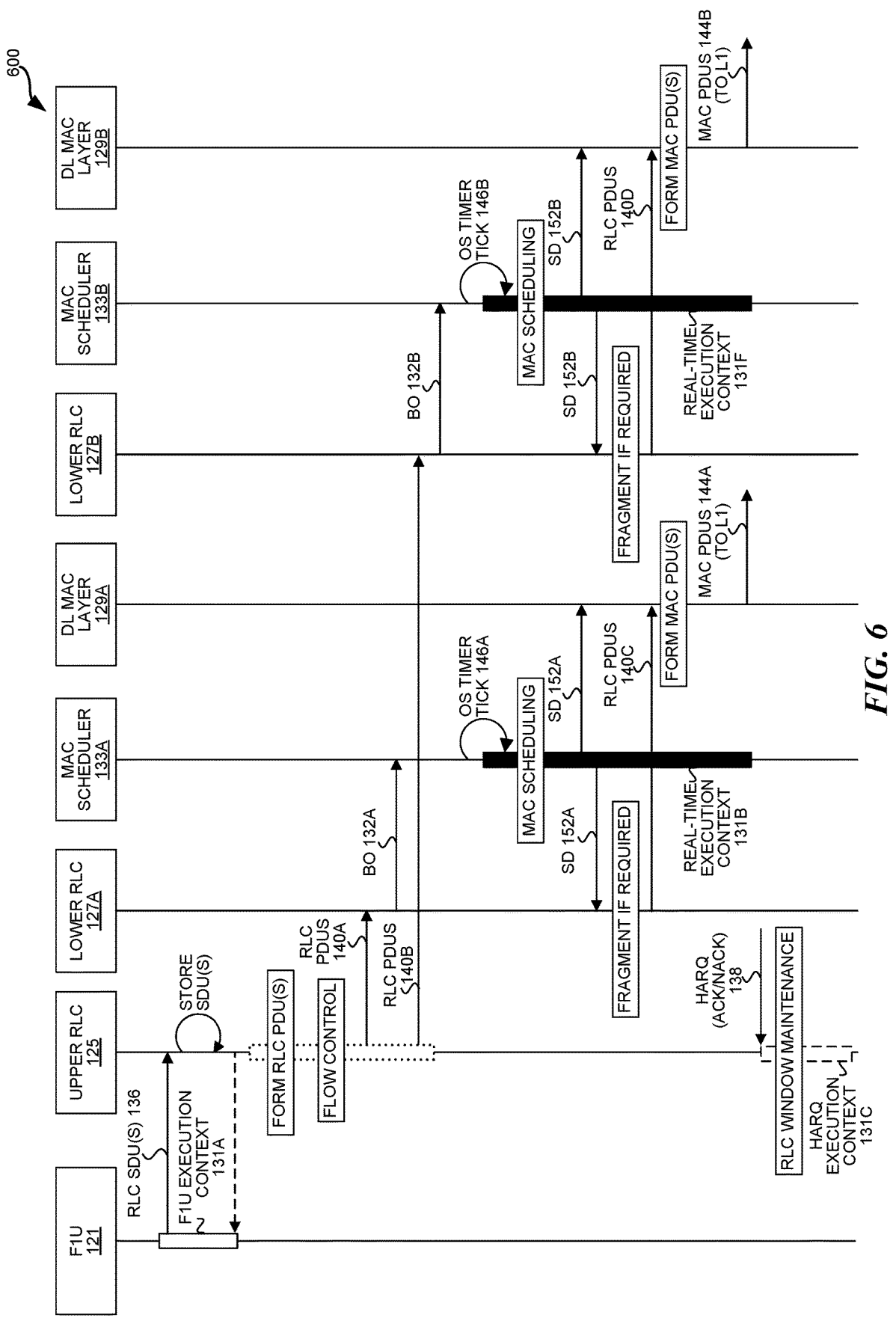
FIG. 6 is a sequence diagram also illustrating the second example implementation of multi-cell scheduling in carrier aggregation (CA)

FIG. 6 is a sequence diagram also illustrating the second example implementation 500, 600 of multi-cell scheduling in carrier aggregation (CA), e.g., in a 5G C-RAN 100A. Specifically, FIG. 6 corresponds to and further describes the DL L2 processing outlined in FIG. 5.

Like the first example implementation 200, 300, the DL Packet Data Convergence Protocol (PDCP) processing may be performed by a PDCP entity 122A in the second example implementation 500, 600. The PDCP processing may be performed at a CU 103 or a DU 105 in a 5G system. The PDCP processing may include receiving IP packets from an IP layer (not shown), removing the IP header from the IP packets and adding a PDCP header to form RLC SDUs 136.

However, unlike the first example implementation 200, 300, the downlink Radio Link Control (RLC) processing may be split into a single DL upper RLC entity 125 and lower RLC entities 127A-B (one for each carrier) in the second example implementation 500, 600. Processing may occur between the DL upper RLC entity 125 and the lower RLC entities 127A-B, which can resemble the F1U transparent layer between the PDCP entity 122A and the DL upper RLC entity 125 (with similar flow control mechanism).

Accordingly, the PDCP entity 122A sends RLC Service Data Units (SDUs) to the DL upper RLC entity 125, e.g., via a transparent F1U layer 121 that ensures that the PDCP entity 122A and the DL upper RLC entity 125 can be disaggregated in two different places. For example, the PDCP entity 122A-B could be implemented in a CU 103 and the DL upper RLC entity 125 could be implemented in a DU 105 in a 5G C-RAN 100A. The RLC SDUs 136 may be formed and sent to the DL upper RLC entity 125 during a single F1U execution context 131A (solid vertical bar with white fill in FIG. 6).

A single DL upper RLC entity 125 may be used for all cells the controller (e.g. DU 105) implements and may run in a non-real-time fashion. The DL upper RLC entity 125 is responsible for PDU formation, Poll PDU processing (processing HARQ (ACK/NACK) 138 received from UE 110), RLC ARQ window control, and flow control. The flow control is added to keep the individual MAC queue at an appropriate level.

As before, a given UE 110 may have multiple bearers (e.g., tunnels to the Internet) in CA and each of the UE's bearers has a separate queue at the DL upper RLC entity 125. Thus, the DL upper RLC entity 125 operates on a per-bearer basis, while the MAC scheduler 126A and MAC layers 128A-B operate on a per-UE basis in the second example implementation 500, 600 of multi-cell CA. A single DL upper RLC entity 125 is used for all carriers in the second example implementation 500, 600 of multi-cell scheduling in CA.

In some configurations, UL layer 1 entities 13000D (e.g., in the RUs 108) can send baseband data to the UL MAC entit(ies) 129C-D (e.g., in a DU 105), which are communicatively coupled to the UL RLC entity 124C, e.g., that is co-located with the DL upper RLC entity 125.

Upon receiving the RLC SDUs 136, the DL upper RLC entity 125 may store the SDUs 136 in the appropriate queue(s). Unlike the first example implementation 200, 300, a MAC buffer occupancy update 132 is not sent immediately upon receiving the RLC SDUs 136 in the second example implementation 500, 600 of multi-cell scheduling in CA. Instead, the DL upper RLC entity 125 assigns each SDU (e.g., from the F1U layer 121) a different sequence number (SN), and forms the RLC PDUs 140A-B.

Then, flow control processing in the DL upper RLC entity 125 determines which RLC PDU(s) go to which lower RLC entities 127A-B. A separate lower RLC entity 127A-B is implemented for every cell and its corresponding carrier. Thus, there will be at least three entities implemented for every carrier in the system 100: a lower RLC 127A-B, a MAC (inside the MAC layer 129), and the other MAC processing (inside the MAC layer 129). The lower RLC entities 127A-B may perform segmentation of RLC PDUs 140A-B if necessary. This is possible in 5G NR because there is one RLC sequence number (SN) per RLC SDU 136, which was not the case in LTE. In LTE there can be just one RLC SN per transport block. The lower RLC entities 127A-B may run in parallel with real-time constraints (e.g., producing output within milliseconds or microseconds of receiving input). If segmentation is required, the lower RLC entities 127A-B may send the segmented RLC PDUs 140A-B to the DL MAC layers 129A-B. If no segmentation is required, the lower RLC entities 127A-B may send the same RLC PDUs 140A-B they received from the DL upper RLC entity 125 to the DL MAC layers 129A-B. The lower RLC entities 127A-B may also perform additional functions.

Additionally, as noted above, RLC is responsible for automatic repeat request (ARQ) processing, among other additional functionality. 3GPP defines two RLC modes: (1) acknowledged mode (AM) that uses automatic repeat request (ARQ); or (2) unacknowledged mode (UM), which does not use ARQ but still uses a window concept, e.g., in UM, RLC will still assign sequence numbers (SNs) but will not take responsibility to retransmit if there is a failure. In AM, the DL upper RLC entity 125 is responsible for buffering RLC PDUs 140A-B within the RLC window. The DL upper RLC entity 125 also handles the retransmission out of this buffer, e.g., in response to receiving HARQ 138 that is an NACK. In AM, the lower RLC entities 127A-B will have only buffering pertaining to HARQ 138.

After a lower RLC 127A-B receives RLC PDU(s) 140A-B from the DL upper RLC entity 125, it sends a buffer occupancy update 132A-B to one of a plurality MAC schedulers 133A-B (one for each cell and its associated carrier). The per-cell MAC schedulers 133 and other MAC processing (HARQ 138, MAC PDU 144 formation, etc.) can be part of the same entity (as in FIG. 5) or different entities (as in FIG. 6). In either case, a different MAC scheduler 133 may be implemented for each cell. Additionally, in some cases, the MAC schedulers 133 will be in different computing devices that combine to implement a controller (e.g., a 5G DU 105).

In response to an OS timer tick 146A-B (e.g., occurring at the beginning of the real-time execution contexts 131B, 131F represented by the solid black vertical bars in FIG. 6), each per-cell MAC scheduler 133 may make scheduling decisions (SD) 152A-B only based on the knowledge of the cell-specific queue for the UE 110 that it has. Specifically, each of N MAC schedulers 133 may, during overlapping time periods, perform scheduling using a respective MAC buffer occupancy update 132A-B from its respective lower RLC entity 127A-B (and/or the DL upper RLC entity 125 in some configurations). Each MAC buffer occupancy update 132A-B indicates how much data is still pending in a particular bearer queue for a particular UE 110. For example, each of N MAC buffer occupancy updates 132A-B can indicate, for N bearers, the total (or differential) data that is pending in one of N bearer queues for the UE 110. Additionally or alternatively, each carrier-specific MAC scheduler 133 in the second example implementation may be informed of the full-bearer buffer occupancy (sum across all carriers), e.g., by the MAC buffer occupancy update 132A-B.

Each MAC scheduler 133 sends a respective scheduling decision 152A-B to its respective lower RLC entity 127A-B for its respective cell. If no fragmentation (also called "segmentation") is required (determined using the respective scheduling decision 152A-B and queue size), the lower RLC entities 127A-B send the respective RLC PDUs 140C-D to the MAC layer for MAC PDU 144A-B formation. If fragmentation is required, the lower RLC entities 127A-B will perform the fragmentation before sending the respective RLC PDUs 140C-D to the respective MAC layers (each of which are optionally implemented as part of the same DL MAC entities 129A-B). Segmentation/fragmentation is an operation where an entity (e.g., the lower RLC entity 127A-B) breaks down a PDU (identified by an RLC Sequence Number (SN)) into smaller chunks/fragments to fit the scheduling needs. All fragments belong to the same SN but are independently demarcated and identifiable so that the receiver (e.g., the UE 110 for DL transmissions) can put the original PDU together and also are identifiable during retransmission.

The DL MAC entities 129A-B then form MAC PDUs 144A-B from the RLC PDUs 140C-D for their respective cells and, if applicable, add additional MAC control information to the MAC PDUs 144A-B. Forming the MAC PDUs 144A-B may include adding padding to make the resulting MAC PDUs 144A-B fit in transmission time intervals (TTIs).

The respective DL MAC entities 129A-B may send the respective MAC PDUs 144 to respective DL layer 1 entities 130A-B for L1 processing. The L1 processing may be performed at a controller (e.g., DU 105) and/or RU(s) 108. In some configurations, a portion of L1 processing is performed at the controller (e.g., DU 105) and a portion is performed at the RU(s) 108.

The DL HARQ 138 (ACK or NACK) that is received on the uplink on the primary carrier is sent back to all DL MAC entities/layers 129A-B, and each process the bits of interest, e.g., during a HARQ (ACK/NACK) execution context 131C (dashed vertical bar with white fill in FIG. 6). The DL HARQ 138 (ACK or NACK) may also be sent from the DL MAC entities 129A-B to the lower RLC entit(ies) 127A-B, which send to the DL upper RLC entity 125. Specifically, the UL layer 1 entity 130C for the primary cell may decode the DL HARQ 138 (ACK or NACK) from UL channel (physical uplink control channel (PUCCH) or physical uplink shared channel (PUSCH)), and the send it to all DL MAC entities/layers 129A-B, which send it to the lower RLC entities 127A-B, which send it to the DL upper RLC entity 125.

For example, assume there are two lower RLC entities 127A-B running, the DL HARQ 138 (ACK or NACK) comes together in uplink (in most cases). So if the L1 sends the feedback to just the master, then master needs to send it to slave node. So instead the UL layer 1 130C for the primary cell/carrier will send the HARQ 138 to all DL MAC entities 129A-B.

There are several advantages of using the second example implementation 500, 600 of multi-cell carrier aggregation (parallelized lower RLC entities 127A-B and MAC schedulers 133A-B). First, because the MAC schedulers 133 in the second example implementation 500, 600 each serve a different single cell, parallel MAC schedulers 133 would reduce the required processing resources required by each MAC scheduler 133 compared to the single monolithic MAC scheduler 126A-B in the first example implementation 200, 300. For example, each MAC scheduler 133 in the second example implementation 500, 600 may require 350 MIPS per, e.g., instead of 1000 MIPS in the first example implementation 200, 300.

Second, if N MAC schedulers 133 are used for N cells in N-carrier CA, the parallelization of lower RLC entities 127A-B and MAC schedulers 133 means that the RLC PDUS 140A-B formation (at the lower RLC entities 127A-B) doesn't have to wait for the full MAC scheduling decision 134 as in the first example implementation 200, 300. Put another way, where the processing in the first example implementation 200, 300 only parallelizes after the RLC PDUs 140A-B are formed (because RLC SNs are sequential and the RLC PDUs 140A-B have to be formed sequentially). But the second example implementation 500, 600 splits the RLC entity 124A into two pieces (the DL upper RLC entity 125 and N lower RLC entities 127A-B) and does the scheduling for each carrier independently of each other. Since MAC scheduling is part of the real-time context, this parallelization can thus enable accommodation of more carriers for aggregation in a C-RAN 100 by reducing the time duration needed for overall L2 processing.

Third, horizontal scaling (e.g., higher-order CA) may be better achieved when the different DL entities (DL lower RLC entities 127A-B and DL MAC schedulers 133) broken into smaller pieces. For example, if desired, the lower RLC entity 127, and the DL MAC entity 129 (e.g., with MAC scheduler 133 and other MAC layer processing) for a given carrier can be in a different processor or physical server than the DL upper RLC entity 125 using the horizontal scaling of the second example implementation 500, 600. So the second example implementation 500, 600 is more scalable, (e.g., for 4 or 8 carriers) than having one big MAC scheduler 133.

Fourth, in certain stack implementations when Frequency Division Duplex (FDD) and Time Division Duplex (TDD) are not supported in the same instance, this parallelization would help.

It should be noted that if the first example implementation 200, 300 were enhanced to have per-carrier MAC schedulers (by providing per-carrier buffer occupancy updates) alone without having per-carrier lower RLC entities, the complete gain available from parallelization is not realized. Only by having per-carrier MAC schedulers along with corresponding per carrier lower RLC entities, can a downlink L2 implementation realize all the benefits available from running completely in parallel for each carrier.

It should be noted that the per-cell MAC schedulers 133 in the second example implementation 500, 600 might not have the absolute knowledge of all the buffers' statuses. So if proportional fairness scheduling is used, the proportionality is only within the queues of a given cell. For example, if many packets are scheduled on a first carrier and only a few on a second carrier, UEs 110 with lots of data could receive more scheduling than UEs 110 with less data whereas if full buffer occupancy across cells was considered by the MAC schedulers 133, the scheduling decision 134 would be different. One workaround is that, even though only a subset of PDUs (for a particular carrier) are sent to a MAC entity 129A-B, the overall queue load in the system for a given UE (across carriers) could also be sent to the MAC entities 129A-B, which could be used for the scheduling decision 134 prioritization. This would have some latency (e.g., a few transmission time intervals (TTIs)) because after the scheduling is done and PDUs are formed, the DL upper RLC entity 125 would have to be informed what has happened so that the queue load would subsequently be maintained.

Furthermore, the flow control process between the DL upper RLC entity 125 and the lower RLC entities 127A-B may result in additional processing.

Additionally, since a decision is made by DL upper RLC entity 125 to send packet(s) to a lower RLC entity 127A-B and a MAC entity 129A-B ahead of time, the packet(s) arriving out of sequence may cause more delay. For example, suppose there are two carriers, A and B, and the DL upper RLC entity 125 sends packets with SNs 1,2,3 to A and 4,5,6 to B. So the UE's PDCP entity will not deliver the packets to the UE's application layer until 1,2,3,4,5,6 are received. Accordingly, if the carrier has a smaller data carrying capacity (e.g., due to SINR, BW, HARQ errors, etc.) there may be some delay in delivering the packet to the UE's application layer in the second example implementation 500, 600. In contrast, if using the first example implementation 200, 300: after sending packet 1 on carrier A, packets 2,3,4,5 might have gone in carrier B. Assuming 1 was received at the UE 110 after 2 or 3, the packets (1,2,3) would be delivered to the application layer after receipt of packet 1. So the first example implementation 200, 300 might result in lower latency in a minority of cases.

Figure 7:
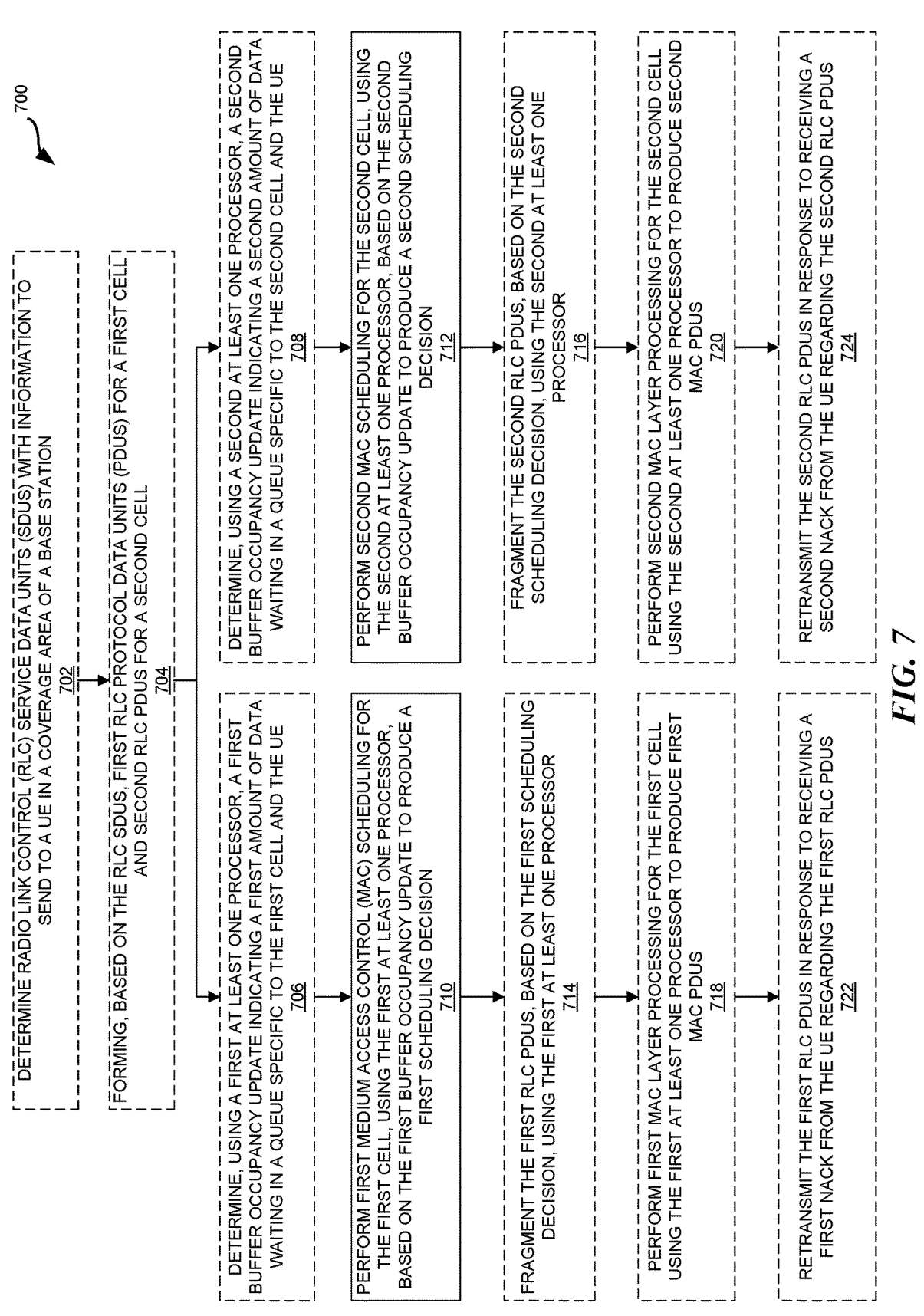
FIG. 7 is a flow diagram illustrating a method for the second example implementation of multi-cell scheduling in carrier aggregation (CA)

FIG. 7 is a flow diagram illustrating a method 700 for the second example implementation 500, 600 of multi-cell scheduling in carrier aggregation (CA) in a base station 100A-D. For example, the method 700 may be performed by a C-RAN 100A-B. Specifically, the method 700 may be performed, at least in part, by at least two processors implementing a single controller (e.g., a 5G DU 105 or a 4G baseband controller 104), e.g., in the C-RAN 100A-B. In some configurations, the controller (e.g., 5G DU 105) may be implemented across multiple physically separate computing devices (e.g., servers), each with their own respective processor(s) and memor(ies). While described in the context of a C-RAN 100A-B, the method 700 could alternatively be performed in any type of base station 100A-D, e.g., a macro base station 100C or other type of small cell 100D.

Alternatively, in some configurations (not shown in the Figures), at least partial DU 105 functionality and RU 108 functionality are both implemented in the same physical housing. In such configurations, each DU/RU combination computing device may implement the RF functionality, L1 functionality, and at least some L2 functionality (e.g., DL lower RLC functions and DL MAC functions such as scheduling, HARQ, and/or PDU formation). In such configurations, the DL upper RLC processing (discussed below) and higher processing (e.g., PDCP processing) is implemented in a physically separate CU 103 that is communicatively coupled to the DU/RU combination device(s). In such configurations, the method 700 is performed in at least one DU/RU combination computing device and optionally in a CU 103. In other words, a DU/RU combination computing device may implement at least some of the controller functionality of the method 700 in some configurations.

In some configurations, PDCP processing for a 5G C-RAN 100A is performed in a CU 103; the RLC processing, MAC scheduling, and other MAC processing (e.g., MAC PDU 144 formation) is performed by a controller (e.g., DU 105); and the physical layer (Layer 1) processing is performed at the controller (e.g., DU 105), the RUs 108, or some combination of the controller and RUs 108.

The method 700 refers to MAC scheduling and MAC layer processing for two carrier frequencies of two respective cells, however, it is understood that the method 700 is applicable for N carrier frequencies of N respective cells.

The blocks of the flow diagram shown in FIG. 7 have been arranged in a generally sequential manner for ease of explanation; however, it is to be understood that this arrangement is merely exemplary, and it should be recognized that the processing associated with method 700 (and the blocks shown in FIG. 7) can occur in a different order (for example, where at least some of the processing associated with the blocks is performed in parallel and/or in an event-driven manner). Also, most standard exception handling is not described for ease of explanation; however, it is to be understood that method 700 can and typically would include such exception handling.

The method 700 begins at optional step 702 where the controller determines RLC SDUs 136 with information to send to a UE 110 in the coverage area of the base station 100A-D (e.g., C-RAN 100A-B). The controller may receive the RLC SDUs 136, e.g., the RLC SDUs 136 may be generated by the PDCP processing, such as in the CU 103 of a C-RAN 100A-B. Alternatively, the controller may perform PDCP processing that produces the RLC SDUs 136. The PDCP processing may include receiving IP packets from an IP layer, removing the IP header from the IP packets and adding a PDCP header to form the RLC SDUs 136.

The method 700 continues at optional step 704 where the controller forms, based on the RLC SDUs 136, first RLC PDUs 140A for a first cell (e.g., to be sent on a first carrier frequency) and second RLC PDUs 140B for a second cell (e.g., to be sent on a second carrier frequency). Optional step 704 may include a DL upper RLC entity 125 in the controller adding an RLC header to the RLC SDUs 140A-B based on the RLC mode of operation, e.g., acknowledged mode (AM) or unacknowledged mode (UM).

The method 700 continues at optional step 706 where the controller determines, using a first at least one processor, a first buffer occupancy update 132A indicating a first amount of data waiting in a queue specific to the first cell and the UE 110, e.g., the queue indicates the first amount of data waiting to be sent to the UE 110 on the first cell (and its associated carrier frequency). Optional step 706 may include the first buffer occupancy update 132A being sent to a first MAC schedulers 133A (specific to the first cell and its associated first carrier frequency).

The method 700 continues at optional step 708 where the controller determines, using a second at least one processor, a second buffer occupancy update 132B indicating a second amount of data waiting in a queue specific to the second cell and the UE 110, e.g., the queue indicates the second amount of data waiting to be sent to the UE 110 on the second cell (and its associated carrier frequency). Optional step 708 may include the second buffer occupancy update 132B being sent to a second MAC schedulers 133B (specific to the second cell and its associated second carrier frequency).

The method 700 continues at step 710 where the controller performs first Medium Access Control (MAC) scheduling for the first cell, using the first at least one processor, based on the first buffer occupancy update 132A to produce a first scheduling decision 152A. The first MAC scheduling may include assigning first time-frequency resources on the first carrier frequency to the first RLC PDUs 140A for the first cell, e.g., but not assigning second time-frequency resources on the second carrier frequency to the first RLC PDUs 140B for the first cell. The first MAC scheduling may make the first scheduling decisions (SD) 152A only based on the knowledge of a queue for the UE 110 that is specific to the first cell.

The method 700 continues at step 712 where the controller performs second MAC scheduling for the second cell, using the second at least one processor, based on the second buffer occupancy update 132B to produce a second scheduling decision 152B. The second at least one processor may be different from (and not overlap) with the first at least one processor in some configurations. In some configurations, the first at least one processor are located in physically separate computing device(s) than the second at least one processor. The first MAC scheduling and the second MAC scheduling may be performed in parallel or at least during partially overlapping time periods.

The second MAC scheduling may include assigning second time-frequency resources on the second carrier frequency to the second RLC PDUs 140B for the second cell. The second MAC scheduling may make the second scheduling decisions (SD) 152B only based on the knowledge of a queue for the UE 110 that is specific to the second cell.

The method 700 continues at optional step 714 where the controller fragments the first RLC PDUs 140A, based on the first scheduling decision 152A, using the first at least one processor. For example, if the first scheduling decision 152A allocates only 300 bytes and the first RLC PDUs 140A have 500 bytes, optional step 714 may include fragmenting the 500 bytes in the first RLC PDUs 140A into two different RLC PDUs 140C.

The method 700 continues at optional step 716 where the controller fragments the second RLC PDUs 140B, based on the second scheduling decision 152B, using the second at least one processor. For example, if the second scheduling decision 152B allocates only 300 bytes and the second RLC PDUs 140B have 500 bytes, optional step 716 may include fragmenting the 500 bytes in the second RLC PDUs 140B into two different RLC PDUs 140D.

The method 700 continues at optional step 718 where the controller performs first MAC layer processing for the first cell using the first at least one processor. Optional step 718 may include adding a MAC header to the first RLC PDUs 140A (or fragmented first RLC PDUs 140C if optional step 714 is performed) to produce first MAC PDUs 144A. The first MAC PDUs 144A may be sent to a DL layer 1 entity 130A for L1 processing, e.g., at one or more RUs 108.

The method 700 continues at optional step 720 where the controller performs second MAC layer processing for the second cell using the second at least one processor. Optional step 720 may include adding a MAC header to the second RLC PDUs 140B (or fragmented second RLC PDUs 140D if optional step 716 is performed) to produce second MAC PDUs 144B. The second MAC PDUs 144B may be sent to a DL layer 1 entity 130B for L1 processing, e.g., at one or more RUs 108.

The method 700 continues at optional step 722 where the controller initiates retransmission of the first RLC PDUs 140A in response to receiving a first NACK from the UE 110 regarding the first RLC PDUs 140A (or fragmented RLC PDUs 140C).

The method 700 continues at optional step 724 where the controller initiates retransmission of the second RLC PDUs 140B in response to receiving a second NACK from the UE 110 regarding the second RLC PDUs 140B (or fragmented RLC PDUs 140D).

Third Example Implementation of Multi-Cell Carrier Aggregation

Figure 8:
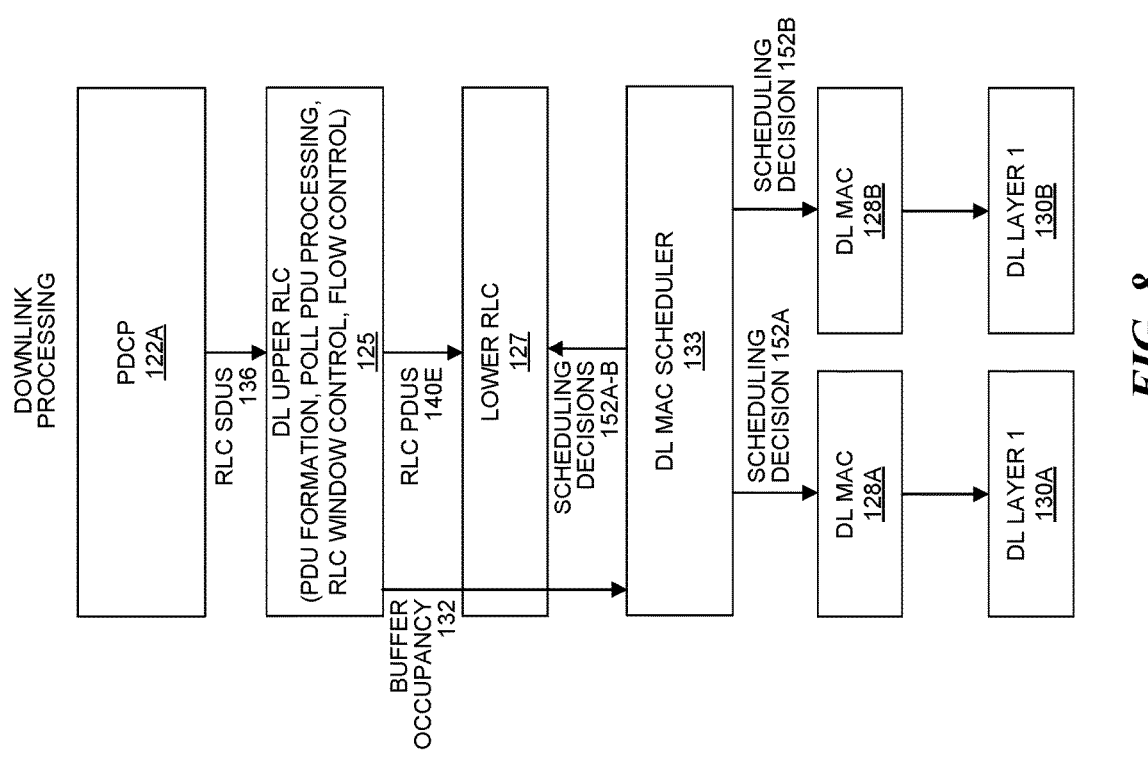
FIG. 8 is a block diagram illustrating a third example implementation of multi-cell carrier aggregation.

FIG. 8 is a block diagram illustrating a third example implementation 800 of multi-cell carrier aggregation. Like the second example implementation 500, 600, the processing shown in FIG. 8 may be performed by a single controller (e.g., a DU 105 in 5G) that implements multiple cells (and a different carrier for each cell), e.g., the single controller can be implemented by the combination of multiple physically-separate computing devices. However, it is understood that the present systems and methods can be implemented in the controller of any type of base station 100A-D, e.g., C-RAN 100A-B, other small cell 100D, a macro base station 100C, and/or a distributed antenna system (DAS) (not shown).

Like the second example implementation 500, 600 of multi-cell carrier aggregation, the RLC processing in the third example implementation 800 is split between a DL upper RLC entity 125 and a lower RLC entity 127. However, unlike the second example implementation 500, 600, the third example implementation 800, 900 can also use a single lower RLC entity 127 and a single DL MAC scheduler 133 to perform lower RLC processing and DL MAC scheduling, respectively. Alternatively, N per-cell lower RLC entities 127A-B and/or N per-cell MAC schedulers 133A-B could also be used in the third example implementation 800, 900.

Although only two DL MAC entities 129A-B and DL layer 1 entities 130A-B are shown in FIG. 8, there can be N of each, where each one processes for a different cell and carrier of N cells and N carriers. As noted above, each cell may map to a different carrier in multi-cell CA. In some configurations, data from any or all bearers can go on any, some, or all component carriers.

Furthermore, the uplink processing is not shown, but would likely be implemented, e.g., similar or identical to the uplink processing in FIGS. 2 and/or 5. Additionally, while some information is shown as being passed between entities in FIG. 8, this should not be viewed as limiting what information is passed. Furthermore, other connections can also be made between entities not shown in FIG. 8. Additionally, downlink and uplink entities that correspond to each other may be implemented in the same processor or processor core.

Figure 9:
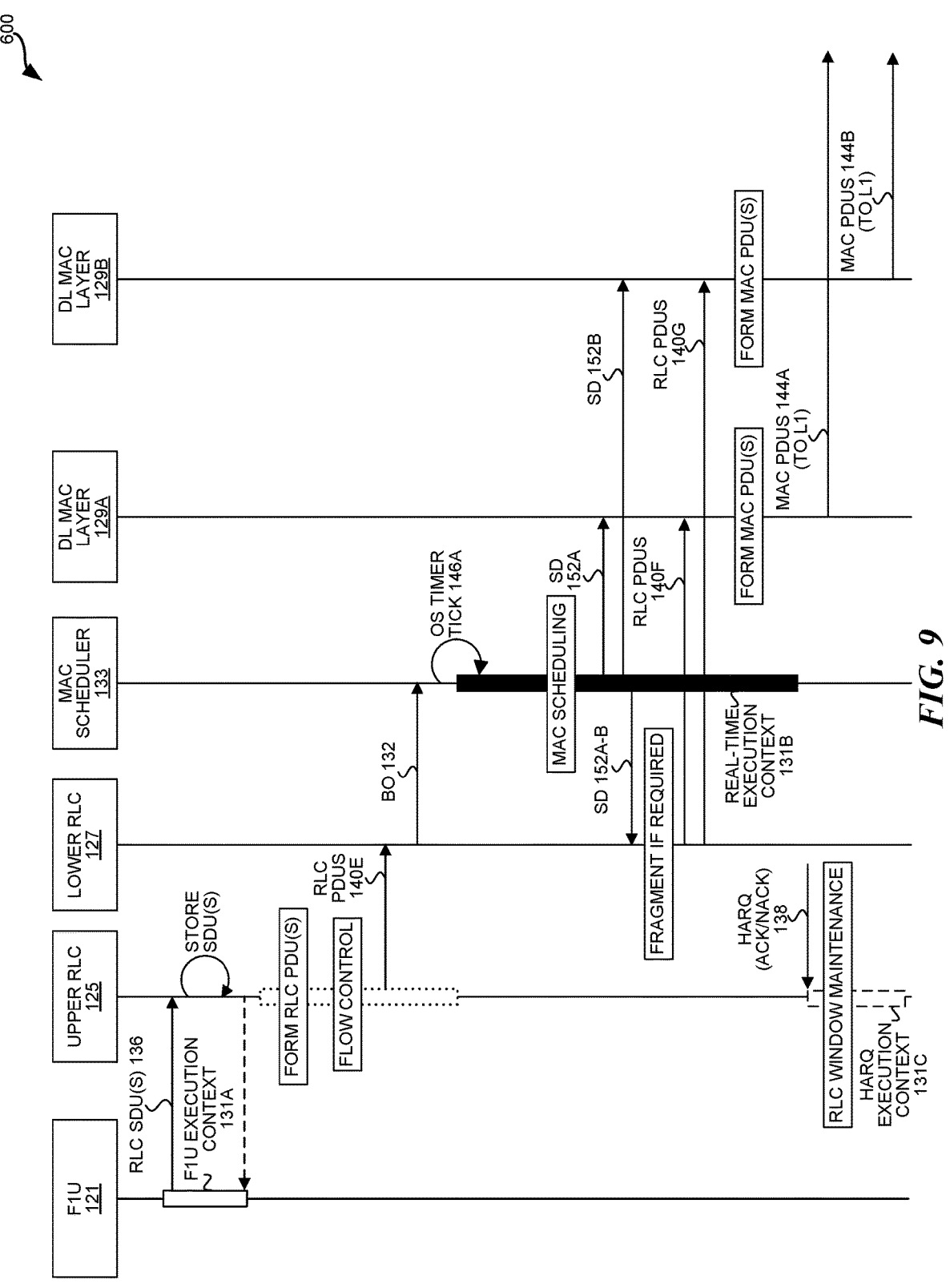
FIG. 9 is a sequence diagram also illustrating the third example implementation of multi-cell scheduling in carrier aggregation (CA)

FIG. 9 is a sequence diagram also illustrating the third example implementation 800, 900 of multi-cell scheduling in carrier aggregation (CA), e.g., in a C-RAN 100A-B. Specifically, FIG. 9 corresponds to and further describes the DL L2 processing outlined in FIG. 8. Unless otherwise noted, processing blocks in FIGS. 8-9 with the same reference numbers as those in FIGS. 5-6 may implement similar or identical functionality.

Like before, the DL Packet Data Convergence Protocol (PDCP) processing may be performed by a PDCP entity 122 in the third example implementation 800, 900. The PDCP processing may be performed at a CU 103 or a DU 105 in a 5G system. The PDCP processing may include receiving IP packets from an IP layer (not shown), removing the IP header from the IP packets and adding a PDCP header to form RLC SDUs 136.

In the third example implementation 800, 900, the downlink Radio Link Control (RLC) processing may be split into a single DL upper RLC entity 125 and lower RLC entity 127 (one for all carriers) in the third example implementation 800, 900. Processing may occur between the DL upper RLC entity 125 and the lower RLC entity 127, which can resemble the F1U transparent layer between the PDCP entity 122 and the DL upper RLC entity 125 (with similar flow control mechanism).

Accordingly, the PDCP entity 122 sends RLC Service Data Units (SDUs) 136 to the DL upper RLC entity 125, e.g., via a transparent F1U layer 121 that ensures that the PDCP entity 122 and the DL upper RLC entity 125 can be disaggregated in two different places. For example, the PDCP entity 122 could be implemented in a CU 103 and the DL upper RLC entity 125 could be implemented in a DU 105 in a 5G C-RAN 100A. The RLC SDUs 136 may be formed and sent to the DL upper RLC entity 125 during a single F1U execution context 131A (solid vertical bar with white fill in FIG. 9).

A single DL upper RLC entity 125 may be used for all cells the DU 105 implements and may run in a non-real-time fashion. The DL upper RLC entity 125 is responsible for PDU formation, Poll PDU processing (processing HARQ (ACK/NACK) 138 received from UE 110), RLC ARQ window control, and flow control.

As before, a given UE 110 may have multiple bearers (e.g., tunnels to the Internet) in CA and each of the UE's bearers has a separate queue at the DL upper RLC entity 125. Thus, the DL upper RLC entity 125 operates on a per-bearer basis. However, a single lower RLC entity 127 and/or a single MAC scheduler 133 may operate for all cells implemented by the base station.

Upon receiving the RLC SDUs 136, the DL upper RLC entity 125 may store the SDUs 136 in the appropriate queue(s). Like the second example implementation 500, 600, the DL upper RLC entity 125 in the third example implementation 800, 900 may assign each SDU (e.g., from the F1U layer 121) a different sequence number (SN), and forms the RLC PDUs 140F-G.

Then, the DL upper RLC entity 125 sends RLC PDUs 140E to the lower RLC entity 127. The same lower RLC entity 127 may perform segmentation of RLC PDUs 140E for every cell and its corresponding carrier, where necessary. The lower RLC entity 127 may run with real-time constraints (e.g., producing output within milliseconds or microseconds of receiving input), while the DL upper RLC entity 125 may run in non-real-time. If segmentation is required, the lower RLC entity 127 may send the segmented RLC PDUs 140F-G to the DL MAC layers 129A-B. If no segmentation is required, the lower RLC entity 127 may pass forward the same RLC PDUs 140E they received from the DL upper RLC entity 125 to the DL MAC layers 129A-B.

Additionally, as noted above, RLC is responsible for automatic repeat request (ARQ) processing, among other additional functionality. 3GPP defines two RLC modes: (1) acknowledged mode (AM) that uses automatic repeat request (ARQ); or (2) unacknowledged mode (UM), which does not use ARQ but still uses a window concept, e.g., in UM, RLC will still assign sequence numbers (SNs) but will not take responsibility to retransmit if there is a failure. In AM, the DL upper RLC entity 125 is responsible for buffering RLC PDUs 140A-B within the RLC window. The DL upper RLC entity 125 also handles the retransmission out of this buffer, e.g., in response to receiving HARQ 138 that is an NACK. In AM, the lower RLC entities 127A-B will have only buffering pertaining to HARQ 138.

After the lower RLC 127 receives RLC PDU(s) 140F-G from the DL upper RLC entity 125, it sends a buffer occupancy update 132 the MAC scheduler 133, which can optionally reflect the data in the buffer maintained for each cell and its associated carrier. A single MAC scheduler 133 may be implemented for all cells.

In response to an OS timer tick 146 (e.g., occurring at the beginning of the real-time execution context 131B represented by the solid black vertical bar in FIG. 9), the MAC scheduler 133 may make scheduling decisions (SD) 152A-B based on the knowledge of the cell-specific queues for the UEs 110. Specifically, the MAC scheduler 133 may perform scheduling using the MAC buffer occupancy update 132. The MAC buffer occupancy update 132 indicates how much data is still pending in a particular bearer queue (e.g., at the DL upper RLC entity 125) for a particular UE 110. For example, N MAC buffer occupancy updates 132 may be sent, each indicating, for one of N bearers, the total (or differential) data that is pending in one of N bearer queues for the UE 110. Additionally or alternatively, the MAC scheduler 133 in the third example implementation 800, 900 may receive a single buffer occupancy update indicating the pending data for the N bearer queues individually and/or collectively.

The MAC scheduler 133 may send a scheduling decision 152A-B to the lower RLC entity 127 for each of the cells. If no fragmentation (also called "segmentation") is required (determined using the respective scheduling decision 152A-B and queue size), the lower RLC entity 127 sends the respective RLC PDUs 140F-G to the MAC layers 129A-B for MAC PDU 144A-B formation. If fragmentation is required, the lower RLC entity 127 will perform the fragmentation before sending the respective RLC PDUs 140F-G to the respective MAC layers (each of which are optionally implemented as part of the same DL MAC entities 129A-B). Segmentation/fragmentation is an operation where an entity (e.g., the lower RLC entity 127) breaks down a PDU (identified by an RLC Sequence Number (SN)) into smaller chunks/fragments to fit the scheduling needs. All fragments belong to the same SN but are independently demarcated and identifiable so that the receiver (e.g., the UE 110 for DL transmissions) can put the original PDU together and also are identifiable during retransmission.

The DL MAC entities 129A-B then form MAC PDUs 144A-B from the RLC PDUs 140F-G for their respective cells and, if applicable, add additional MAC control information to the MAC PDUs 144A-B. Forming the MAC PDUs 144A-B may include adding padding to make the resulting MAC PDUs 144A-B fit in transmission time intervals (TTIs).

The respective DL MAC entities 129A-B may send the respective MAC PDUs 144F-G to respective DL layer 1 entities 130A-B for L1 processing. The L1 processing may be performed at a controller (e.g., a DU 105) and/or RU(s) 108. In some configurations, a portion of L1 processing is performed at the DU 105 and a portion is performed at the RU(s) 108.

The DL HARQ 138 (ACK or NACK) that is received on the uplink on the primary carrier can be sent back to all DL MAC entities/layers 129A-B, where each process the bits of interest, e.g., during a HARQ (ACK/NACK) execution context 131C (dashed vertical bar with white fill in FIG. 9). The DL HARQ 138 (ACK or NACK) may also be sent from the DL MAC entities 129A-B to the lower RLC entity 127, which sends to the DL upper RLC entity 125. Specifically, the UL layer 1 entity for the primary cell may decode the DL HARQ 138 (ACK or NACK) from UL channel (physical uplink control channel (PUCCH) or physical uplink shared channel (PUSCH)), and the send it to all DL MAC entities/layers 129A-B, which send it to the lower RLC entity 127, which sends it to the DL upper RLC entity 125.

There are several advantages of using the third example implementation 800, 900 of multi-cell carrier aggregation (parallelized lower RLC entities 127A-B and MAC schedulers 133A-B). Specifically, the third example implementation 800, 900 splits the RLC entity 124A into two pieces (the DL upper RLC entity 125 and a lower RLC entity 127), thus reducing real-time processing (because RLC PDU 140 formation is done outside pipeline and reduces the total Layer-2 processing time).

FIG. 10 is a flow diagram illustrating a method 1000 for the third example implementation 800, 900 of multi-cell scheduling in carrier aggregation (CA) in a base station 100A-D. For example, the method 1000 may be performed by a C-RAN 100A-B. Specifically, the method 1000 may be performed, at least in part, by at least two processors implementing a single controller (e.g., a 5G DU 105 or a 4G baseband controller 104) of the base station (e.g., in a C-RAN 100A-B). In some configurations, the controller (e.g., 5G DU 105) may be implemented across multiple physically separate computing devices (e.g., servers), each with their own respective processor(s) and memor(ies). While described in the context of a C-RAN 100A-B, the method 1000 could alternatively be performed in any type of base station 100A-D, e.g., a macro base station 100C or other type of small cell 100D.

Alternatively, in some configurations (not shown in the Figures), at least partial DU 105 functionality and RU 108 functionality are both implemented in the same physical housing. In such configurations, each DU/RU combination computing device may implement the RF functionality, L1 functionality, and at least some L2 functionality (e.g., DL lower RLC functions and DL MAC functions such as scheduling, HARQ, and/or PDU formation). In such configurations, the DL upper RLC processing (discussed below) and higher processing (e.g., PDCP processing) is implemented in a physically separate CU 103 that is communicatively coupled to the DU/RU combination device(s). In such configurations, the method 1000 is performed in at least one DU/RU combination computing device and optionally in a CU 103. In other words, a DU/RU combination computing device may implement at least some of the controller functionality of the method 1000 in some configurations.

In some configurations, PDCP processing for a 5G C-RAN 100A is performed in a CU 103; the RLC processing, MAC scheduling, and other MAC processing (e.g., MAC PDU 144 formation) is performed by a controller (e.g., DU 105); and the physical layer (Layer 1) processing is performed at the controller (e.g., DU 105), the RUs 108, or some combination of the controller and RUs 108.

The method 1000 refers to MAC scheduling and MAC layer processing for two carrier frequencies of two respective cells, however, it is understood that the method 1000 is applicable for N carrier frequencies of N respective cells.

The blocks of the flow diagram shown in FIG. 10 have been arranged in a generally sequential manner for ease of explanation; however, it is to be understood that this arrangement is merely exemplary, and it should be recognized that the processing associated with method 1000 (and the blocks shown in FIG. 10) can occur in a different order (for example, where at least some of the processing associated with the blocks is performed in parallel and/or in an event-driven manner). Also, most standard exception handling is not described for ease of explanation; however, it is to be understood that method 1000 can and typically would include such exception handling.

The method 1000 begins at optional step 1002 where the controller determines RLC SDUs 136 with information to send to a UE 110 in the coverage area of the base station 100A-D (e.g., C-RAN 100A-B). The controller may receive the RLC SDUs 136, e.g., the RLC SDUs 136 may be generated by the PDCP processing, such as in the CU 103 of a C-RAN 100A-B. Alternatively, the controller may perform PDCP processing that produces the RLC SDUs 136. The PDCP processing may include receiving IP packets from an IP layer, removing the IP header from the IP packets and adding a PDCP header to form the RLC SDUs 136.

The method 1000 continues at step 1004 where the controller forms, at a DL upper RLC entity 125, first RLC PDUs 140A for a first cell (e.g., to be sent on a first carrier frequency) and second RLC PDUs 140B for a second cell (e.g., to be sent on a second carrier frequency) based on the RLC SDUs 136. Step 1004 may include the DL upper RLC entity 125 in the controller adding an RLC header to the RLC SDUs 140A-B based on the RLC mode of operation, e.g., acknowledged mode (AM) or unacknowledged mode (UM).

As noted above, the third example implementation 800, 900 may split the RLC processing into a DL upper RLC entity 125 and a lower RLC entity 127. In some examples, the third example implementation 800, 900 may utilize a single lower RLC entity 127 and a single MAC scheduler 133, each of which operate for all cells implemented by the base station. Alternatively, the third example implementation 800, 900 may use a separate per-cell lower RLC entity 127A-B and MAC scheduler 133A-B for each of N cells (and their associated frequency carrier).

The method 1000 continues at step 1006 where the controller determines, by at least one lower RLC entity 127, at least one buffer occupancy update 132 indicating a first amount of data waiting in a queue specific to the first cell and the UE 110 and a second amount of data waiting in a queue specific to the second cell and the UE 110. For example, the at least one buffer occupancy update 132 can indicate the first amount of data waiting to be sent to the UE 110 on the first cell on its associated carrier frequency and the second amount of data waiting to be sent to the UE 110 on the second cell on its associated carrier frequency. Step 1006 may include the at least one buffer occupancy update 132 being sent to at least one MAC scheduler 133, e.g., that schedules for both cells and their associated carrier frequencies.

In some examples, the DL upper RLC entity 125 is implemented in different processor(s) than the processor(s) implementing the lower RLC entity 127. Additionally, the processor(s) implementing the DL upper RLC entity 125 may be in the same or different computing devices (e.g., servers) than the processor(s) implementing the lower RLC entity 127.

In some examples, the same at least one processor (implementing a single lower RLC entity 127) determines the first amount of data and the second amount of data. In these examples, a single buffer occupancy update 132 may be used to indicate both the first amount of data and the second amount of data.

Alternatively, a first at least one processor (implementing a first lower RLC entity 127A) determines the first amount of data and a second at least one processor (implementing a second lower RLC entity 127B) determines the second amount of data. In these examples, a different buffer occupancy update 132A-B may be determined by each of the different lower RLC entities 127A-B. In these examples, the second at least one processor may be different from (and not overlap) with the first at least one processor. In some configurations, the first at least one processor are located in physically separate computing device(s) than the second at least one processor.

The method 1000 continues at optional step 1008 where the controller performs, based on the at least one buffer occupancy update 132, first Medium Access Control (MAC) scheduling for the first cell to produce a first scheduling decision 152A and second MAC scheduling for the second cell to produce a second scheduling decision 152B. The first MAC scheduling may include assigning first time-frequency resources on the first carrier frequency to the first RLC PDUs 140A for the first cell, e.g., but not assigning second time-frequency resources on the second carrier frequency to the first RLC PDUs 140B for the first cell. The second MAC scheduling may include assigning second time-frequency resources on the second carrier frequency to the second RLC PDUs 140B for the second cell. The second MAC scheduling may make the second scheduling decisions (SD) 152B only based on the knowledge of a queue for the UE 110 that is specific to the second cell.

In some examples, the first MAC scheduling and the second MAC scheduling in optional step 1008 is performed in the same MAC scheduler 133 that utilizes the same at least one processor.

Alternatively, the first MAC scheduling is performed in a first at least one processor (implementing a first per-cell MAC scheduler) and the second MAC scheduling is performed in a second at least one processor (implementing a second per-cell MAC scheduler). In these examples, the second at least one processor may be different from (and not overlap) with the first at least one processor. In some configurations, the first at least one processor are located in physically separate computing device(s) than the second at least one processor.

The method 1000 continues at optional step 1010 where the controller fragments the first RLC PDUs 140A based on the first scheduling decision 152A and/or the second RLC PDUs 140B based on the second scheduling decision 152B. For example, if the first scheduling decision 152A allocates only 300 bytes and the first RLC PDUs 140A have 500 bytes, optional step 1010 may include fragmenting the 500 bytes in the first RLC PDUs 140A into two different RLC PDUs 140C. Similarly, if the second scheduling decision 152B allocates only 300 bytes and the second RLC PDUs 140B have 500 bytes, optional step 1010 may include fragmenting the 500 bytes in the second RLC PDUs 140B into two different RLC PDUs 140D.

In some examples, the same at least one processor (implementing a single lower RLC entity 127) fragments the first RLC PDUs 140A and/or the second RLC PDUs 140B where necessary.

Alternatively, a first at least one processor (implementing a first lower RLC entity 127A) fragments the first RLC PDUs 140A, if necessary and a second at least one processor (implementing a second lower RLC entity 127B) fragments the second RLC PDUs 140B if necessary. In these examples, the second at least one processor may be different from (and not overlap) with the first at least one processor. In some configurations, the first at least one processor are located in physically separate computing device(s) than the second at least one processor.

The method 1000 continues at optional step 1012 where the controller performs first MAC layer processing for the first cell using the first at least one processor. Optional step 1012 may include adding a MAC header to the first RLC PDUs 140A (or fragmented first RLC PDUs 140C if optional step 1010 is performed for the first RLC PDUs 140A) to produce first MAC PDUs 144A. The first MAC PDUs 144A may be sent to a DL layer 1 entity 130A for L1 processing, e.g., at one or more RUs 108.

The method 1000 continues at optional step 1014 where the controller performs second MAC layer processing for the second cell using the second at least one processor. Optional step 1014 may include adding a MAC header to the second RLC PDUs 140B (or fragmented second RLC PDUs 140D if optional step 1014 is performed for the first RLC PDUs 140A) to produce second MAC PDUs 144B. The second MAC PDUs 144B may be sent to a DL layer 1 entity 130B for L1 processing, e.g., at one or more RUs 108.

The method 1000 continues at optional step 1016 where the controller initiates retransmission of the first RLC PDUs 140A in response to receiving a first NACK from the UE 110 regarding the first RLC PDUs 140A (or fragmented RLC PDUs 140C).

The method 1000 continues at optional step 1018 where the controller initiates retransmission of the second RLC PDUs 140B in response to receiving a second NACK from the UE 110 regarding the second RLC PDUs 140B (or fragmented RLC PDUs 140D).

The methods and techniques described here may be implemented in digital electronic circuitry, field programmable gate array (FPGA), or with a programmable processor (for example, a special-purpose processor or a general-purpose processor such as a computer) firmware, software, or in combinations of them. Apparatus embodying these techniques may include appropriate input and output devices, field programmable gate array (FPGA), a programmable processor, and a storage medium tangibly embodying program instructions for execution by the programmable processor. A process embodying these techniques may be performed by a programmable processor executing a program of instructions to perform desired functions by operating on input data and generating appropriate output. The techniques may advantageously be implemented in one or more programs that are executable on a programmable system including at least one programmable processor coupled to receive data and instructions from, and to transmit data and instructions to, a data storage system, at least one input device, and at least one output device. Generally, a processor will receive instructions and data from a read-only memory and/or a random access memory. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and DVD disks. Any of the foregoing may be supplemented by, or incorporated in, specially designed application-specific integrated circuits (ASICs).

Terminology

Brief definitions of terms, abbreviations, and phrases used throughout this application are given below.

The term "determining" and its variants may include calculating, extracting, generating, computing, processing, deriving, modeling, investigating, looking up (e.g., looking up in a table, a database, or another data structure), ascertaining and the like. Also, "determining" may also include receiving (e.g., receiving information), accessing (e.g., accessing data in a memory) and the like. Also, "determining" may include resolving, selecting, choosing, establishing and the like.

The phrase "based on" does not mean "based only on," unless expressly specified otherwise. In other words, the phrase "based on" describes both "based only on" and "based at least on". Additionally, the term "and/or" means "and" or "or". For example, "A and/or B" can mean "A", "B", or "A and B". Additionally, "A, B, and/or C" can mean "A alone," "B alone," "C alone," "A and B," "A and C," "B and C" or "A, B, and C."

The terms "connected", "coupled", and "communicatively coupled" and related terms may refer to direct or indirect connections. If the specification states a component or feature "may," "can," "could," or "might" be included or have a characteristic, that particular component or feature is not required to be included or have the characteristic.

The terms "responsive" or "in response to" may indicate that an action is performed completely or partially in response to another action. The term "module" refers to a functional component implemented in software, hardware, or firmware (or any combination thereof) component.

The methods disclosed herein comprise one or more steps or actions for achieving the described method. Unless a specific order of steps or actions is required for proper operation of the method that is being described, the order and/or use of specific steps and/or actions may be modified without departing from the scope of the claims.

In conclusion, the present disclosure provides novel systems, methods, and arrangements for multi-cell scheduling in carrier aggregation (CA). While detailed descriptions of one or more configurations of the disclosure have been given above, various alternatives, modifications, and equivalents will be apparent to those skilled in the art without varying from the spirit of the disclosure. For example, while the configurations described above refer to particular features, functions, procedures, components, elements, and/or structures, the scope of this disclosure also includes configurations having different combinations of features, functions, procedures, components, elements, and/or structures, and configurations that do not include all of the described features, functions, procedures, components, elements, and/or structures. Accordingly, the scope of the present disclosure is intended to embrace all such alternatives, modifications, and variations as fall within the scope of the claims, together with all equivalents thereof. Therefore, the above description should not be taken as limiting.

EXAMPLES

Example 1 includes a base station, comprising: at least one remote unit (RU) that exchanges radio frequency (RF) signals with a user equipment (UE) using an air interface; and a controller communicatively coupled to the at least one RU, the controller forming first RLC protocol data units (PDUs) for a first cell and second RLC PDUs for a second cell based on Radio Link Control (RLC) service data units (SDUs); wherein a first at least one processor in the controller performs first Medium Access Control (MAC) scheduling for the first cell based on a first buffer occupancy update to produce a first scheduling decision; wherein a second at least one processor in the controller performs second MAC scheduling for the second cell based on a second buffer occupancy update to produce a second scheduling decision.

Example 2 includes the base station of Example 1, wherein the first at least one processor in the controller further determines the first buffer occupancy update, which indicates a first amount of data waiting in a queue specific to the UE and the first cell; wherein the second at least one processor in the controller further determines the second buffer occupancy update, which indicates a second amount of data waiting in a queue specific to the UE and the second cell.

Example 3 includes the base station of any of Examples 1-2, wherein the first at least one processor is implemented in a first at least one computing device; wherein the second at least one processor is implemented in a second at least one computing device physically separate from the first at least one computing device; wherein the first at least one computing device and the second at least one computing device combine to implement the controller.

Example 4 includes the base station of any of Examples 1-3, wherein the at least one remote unit transmit to the UE from the first cell using a first carrier frequency; wherein the at least one remote unit transmit to the UE from the second cell using a second carrier frequency.

Example 5 includes the base station of any of Examples 1-4, wherein the first MAC scheduling and the second MAC scheduling are performed in parallel during at least partially overlapping time periods.

Example 6 includes the base station of any of Examples 1-5, wherein the first at least one processor in the controller further performs first MAC layer processing to produce first MAC PDUs from the first RLC PDUs; wherein the second at least one processor in the controller further performs second MAC layer processing to produce second MAC PDUs from the second RLC PDUs.

Example 7 includes the base station of any of Examples 1-6, wherein the first at least one processor in the controller further: fragments the first RLC PDUs, based on the first scheduling decision; and performs first MAC layer processing to produce first MAC PDUs from the fragmented first RLC PDUs.

Example 8 includes the base station of any of Examples 1-7, wherein the second at least one processor in the controller further: fragments the second RLC PDUs, based on the second scheduling decision; and performs second MAC layer processing to produce second MAC PDUs from the fragmented second RLC PDUs.

Example 9 includes the base station of any of Examples 1-8, wherein the controller further: initiates a first retransmission in response to receiving a first non-acknowledgement (NACK) from the UE regarding the first RLC PDUs; or initiates a second retransmission in response to receiving a second non-acknowledgement (NACK) from the UE regarding the second RLC PDUs.

Example 10 includes the base station of Example 9, wherein the base station is a cloud radio access network (C-RAN), comprising: the at least one RU; at least one Distributed Unit (DU) communicatively coupled to the at least one RU via a front-haul network; and a Central Unit (CU), wherein the controller is implemented in the DU or the CU.

Example 11 includes the base station of Example 10, wherein the CU performs Packet Data Convergence Protocol (PDCP) processing, comprising: receiving Internet Protocol (IP) packets from an IP layer; removing IP headers from the IP packets; adding a PDCP header to form the RLC SDUs; and sending the RLC SDUs to the controller.

Example 12 includes a method performed by a controller in a base station comprising the controller and at least one remote unit (RU) that wirelessly communicates with a UE, the method comprising: forming, based on Radio Link Control (RLC) service data units (SDUs), first RLC protocol data units (PDUs) for a first cell and second RLC PDUs for a second cell; performing, using a first at least one processor, first Medium Access Control (MAC) scheduling for the first cell based on a first buffer occupancy update to produce a first scheduling decision; and performing, using a second at least one processor, second MAC scheduling for the second cell based on a second buffer occupancy update to produce a second scheduling decision.

Example 13 includes the method of Example 12, further comprising: determining, using the first at least one processor, the first buffer occupancy update, which indicates a first amount of data waiting in a queue specific to the UE and the first cell; and determining, using the second at least one processor, the second buffer occupancy update, which indicates a second amount of data waiting in a queue specific to the UE and the second cell.

Example 14 includes the method of any of Examples 12-13, wherein the first at least one processor is implemented in a first at least one computing device; wherein the second at least one processor is implemented in a second at least one computing device physically separate from the first at least one computing device; wherein the first at least one computing device and the second at least one computing device combine to implement the controller.

Example 15 includes the method of any of Examples 12-14, further comprising: transmitting, from the at least one RU, to the UE from the first cell using a first carrier frequency; and transmitting, from the at least one RU, to the UE from the second cell using a second carrier frequency.

Example 16 includes the method of any of Examples 12-15, wherein the first MAC scheduling and the second MAC scheduling are performed in parallel during at least partially overlapping time periods.

Example 17 includes the method of any of Examples 12-16, further comprising: performing, using the first at least one processor, first MAC layer processing to produce first MAC PDUs from the first RLC PDUs; and performing, using the second at least one processor, second MAC layer processing to produce second MAC PDUs from the second RLC PDUs.

Example 18 includes the method of any of Examples 12-17, further comprising: fragmenting, using the first at least one processor, the first RLC PDUs, based on the first scheduling decision; and fragmenting, using the first at least one processor, first MAC layer processing to produce first MAC PDUs from the fragmented first RLC PDUs.

Example 19 includes the method of any of Examples 12-18, further comprising: fragmenting, using the first at least one processor, the second RLC PDUs, based on the second scheduling decision; and fragmenting, using the first at least one processor, second MAC layer processing to produce second MAC PDUs from the fragmented second RLC PDUs.

Example 20 includes the method of any of Examples 12-19, further comprising: initiating a first retransmission in response to receiving a first non-acknowledgement (NACK) from the UE regarding the first RLC PDUs; or initiating a second retransmission in response to receiving a second non-acknowledgement (NACK) from the UE regarding the second RLC PDUs.

Example 21 includes the method of Example 20, wherein the base station is a cloud radio access network (C-RAN), comprising: the at least one RU; at least one Distributed Unit (DU) communicatively coupled to the at least one RU via a front-haul network; and a Central Unit (CU), wherein the controller is implemented in the DU or the CU.

Example 22 includes the method of Example 21, further comprising performing, in the CU, Packet Data Convergence Protocol (PDCP) processing, comprising: receiving Internet Protocol (IP) packets from an IP layer; removing IP headers from the IP packets; adding a PDCP header to form the RLC SDUs; and sending the RLC SDUs to the controller.

Example 23 includes a base station, comprising: at least one remote unit (RU) that exchanges radio frequency (RF) signals with a user equipment (UE) using an air interface; and a controller communicatively coupled to the at least one RU, the controller configured to: form, at an upper RLC entity, first RLC protocol data units (PDUs) for a first cell and second RLC PDUs for a second cell based on Radio Link Control (RLC) service data units (SDUs); determine, by at least one lower RLC entity, at least one buffer occupancy update indicating a first amount of data waiting in a queue specific to the first cell and the UE and a second amount of data waiting in a queue specific to the second cell and the UE.

Example 24 includes the base station of Example 23, wherein the base station is a cloud radio access network (C-RAN), comprising: the at least one RU; at least one Distributed Unit (DU) communicatively coupled to the at least one RU via a front-haul network; and a Central Unit (CU), wherein the controller is implemented in the DU or the CU.

Example 25 includes the base station of any of Examples 23-24, wherein a first at least one processor, implementing a first lower RLC entity, determines the first amount of data; wherein a second at least one processor, implementing a second lower RLC entity, determines the second amount of data.

Example 26 includes the base station of any of Examples 23-25, wherein the controller is further configured to: perform, based on the at least one buffer occupancy update, first Medium Access Control (MAC) scheduling for the first cell to produce a first scheduling decision and second MAC scheduling for the second cell to produce a second scheduling decision.

Example 27 includes the base station of Example 26, wherein the first MAC scheduling is performed in a first at least one processor implementing a first per-cell MAC scheduler; wherein the second MAC scheduling is performed in a second at least one processor implementing a second per-cell MAC scheduler.

Example 28 includes the base station of any of Examples 26-27, wherein the controller fragments at least one of the following: the first RLC PDUs based on the first scheduling decision; and the second RLC PDUs based on the second scheduling decision.

Example 29 includes the base station of any of Examples 23-28, wherein a first at least one processor in the controller further: performs first MAC layer processing to produce first MAC PDUs based on the first RLC PDUs.

Example 30 includes the base station of any of Examples 23-29, wherein a second at least one processor in the controller further: performs second MAC layer processing to produce second MAC PDUs based on the second RLC PDUs.

Example 31 includes the base station of any of Examples 23-30, wherein the controller further: initiates a first retransmission in response to receiving a first non-acknowledgement (NACK) from the UE regarding the first RLC PDUs; or initiates a second retransmission in response to receiving a second non-acknowledgement (NACK) from the UE regarding the second RLC PDUs.

Example 32 includes the base station of Example 31, wherein the base station performs Packet Data Convergence Protocol (PDCP) processing, comprising: receiving Internet Protocol (IP) packets from an IP layer; removing IP headers from the IP packets; adding a PDCP header to form the RLC SDUs; and sending the RLC SDUs to the controller.

Example 33 includes a method performed by a controller in a base station comprising the controller and at least one remote unit (RU) that wirelessly communicates with a UE, the method comprising: forming, at an upper RLC entity, first RLC protocol data units (PDUs) for a first cell and second RLC PDUs for a second cell based on Radio Link Control (RLC) service data units (SDUs); determining, by at least one lower RLC entity, at least one buffer occupancy update indicating a first amount of data waiting in a queue specific to the first cell and the UE and a second amount of data waiting in a queue specific to the second cell and the UE.

Example 34 includes the method of Example 33, wherein the base station is a cloud radio access network (C-RAN), comprising: the at least one RU; at least one Distributed Unit (DU) communicatively coupled to the at least one RU via a front-haul network; and a Central Unit (CU), wherein the controller is implemented in the DU or the CU.

Example 35 includes the method of any of Examples 33-34, determining the first amount of data using a first at least one processor that implements a first lower RLC entity; determining the second amount of data using a second at least one processor that implements a second lower RLC entity.

Example 36 includes the method of any of Examples 33-35, further comprising: performing, based on the at least one buffer occupancy update, first Medium Access Control (MAC) scheduling for the first cell to produce a first scheduling decision and second MAC scheduling for the second cell to produce a second scheduling decision.

Example 37 includes the method of Example 36, further comprising: performing the first MAC scheduling using a first at least one processor that implements a first per-cell MAC scheduler; performing the second MAC scheduling in a second at least one processor that implements a second per-cell MAC scheduler.

Example 38 includes the method of any of Examples 36-37, further comprising fragmenting at least one of the following: the first RLC PDUs based on the first scheduling decision; and the second RLC PDUs based on the second scheduling decision.

Example 39 includes the method of any of Examples 33-38, further comprising performing first MAC layer processing to produce first MAC PDUs based on the first RLC PDUs.

Example 40 includes the method of any of Examples 33-39, further comprising performing second MAC layer processing to produce second MAC PDUs based on the second RLC PDUs.

Example 41 includes the method of any of Examples 33-40, further comprising: initiating a first retransmission in response to receiving a first non-acknowledgement (NACK) from the UE regarding the first RLC PDUs; or initiating a second retransmission in response to receiving a second non-acknowledgement (NACK) from the UE regarding the second RLC PDUs.

Example 42 includes the method of Example 41, further comprising performing Packet Data Convergence Protocol (PDCP) processing, comprising: receiving Internet Protocol (IP) packets from an IP layer; removing IP headers from the IP packets; adding a PDCP header to form the RLC SDUs; and sending the RLC SDUs to the controller.

The invention claimed is:

1. A cloud radio access network (C-RAN), comprising:
a Central Unit (CU);
at least one Distributed Unit (DU);
at least one remote unit (RU), communicatively coupled to the at least one DU via a front-haul network, that exchanges radio frequency (RF) signals with a user equipment (UE) using an air interface;
a controller, implemented in the DU or the CU, communicatively coupled to the at least one RU, the controller forming first Radio Link Control (RLC) protocol data units (PDUs) for a first cell and second RLC PDUs for a second cell based on RLC service data units (SDUs); and
wherein a first at least one processor in the controller performs first Medium Access Control (MAC) scheduling for the first cell based on a first buffer occupancy update to produce a first scheduling decision;
wherein a second at least one processor in the controller performs second MAC scheduling for the second cell based on a second buffer occupancy update to produce a second scheduling decision;
wherein the CU performs Packet Data Convergence Protocol (PDCP) processing, comprising:
receiving Internet Protocol (IP) packets from an IP layer;
removing IP headers from the IP packets;
adding a PDCP header to form the RLC SDUs; and
sending the RLC SDUs to the controller.

2. The C-RAN of claim 1, wherein the first at least one processor in the controller further determines the first buffer occupancy update, which indicates a first amount of data waiting in a queue specific to the UE and the first cell;
wherein the second at least one processor in the controller further determines the second buffer occupancy update, which indicates a second amount of data waiting in a queue specific to the UE and the second cell.

3. The C-RAN of claim 1,
wherein the first at least one processor is implemented in a first at least one computing device;
wherein the second at least one processor is implemented in a second at least one computing device physically separate from the first at least one computing device;
wherein the first at least one computing device and the second at least one computing device combine to implement the controller.

4. The C-RAN of claim 1,
wherein the at least one remote unit transmit to the UE from the first cell using a first carrier frequency;
wherein the at least one remote unit transmit to the UE from the second cell using a second carrier frequency.

5. The C-RAN of claim 1, wherein the first MAC scheduling and the second MAC scheduling are performed in parallel during at least partially overlapping time periods.

6. The C-RAN of claim 1, wherein the first at least one processor in the controller further performs first MAC layer processing to produce first MAC PDUs from the first RLC PDUs;
wherein the second at least one processor in the controller further performs second MAC layer processing to produce second MAC PDUs from the second RLC PDUs.

7. The C-RAN of claim 1, wherein the first at least one processor in the controller further:
fragments the first RLC PDUs, based on the first scheduling decision; and
performs first MAC layer processing to produce first MAC PDUs from the fragmented first RLC PDUs.

8. The C-RAN of claim 1, wherein the second at least one processor in the controller further:
fragments the second RLC PDUs, based on the second scheduling decision; and
performs second MAC layer processing to produce second MAC PDUs from the fragmented second RLC PDUs.

9. The C-RAN of claim 1, wherein the controller further:
initiates a first retransmission in response to receiving a first non-acknowledgement (NACK) from the UE regarding the first RLC PDUs; or
initiates a second retransmission in response to receiving a second non-acknowledgement (NACK) from the UE regarding the second RLC PDUs.

10. A method performed by a controller in a C-RAN comprising a Central Unit, at least one Distributed Unit (DU), the controller implemented in the DU or the CU, and at least one remote unit (RU) that wirelessly communicates with a UE, the method comprising:
forming, based on Radio Link Control (RLC) service data units (SDUs), first RLC protocol data units (PDUs) for a first cell and second RLC PDUs for a second cell;
performing, using a first at least one processor, first Medium Access Control (MAC) scheduling for the first cell based on a first buffer occupancy update to produce a first scheduling decision; and
performing, using a second at least one processor, second MAC scheduling for the second cell based on a second buffer occupancy update to produce a second scheduling decision;
performing, in the CU, Packet Data Convergence Protocol (PDCP) processing, comprising:
receiving Internet Protocol (IP) packets from an IP layer;
removing IP headers from the IP packets;
adding a PDCP header to form the RLC SDUs; and
sending the RLC SDUs to the controller.

11. The method of claim 10, further comprising:
determining, using the first at least one processor, the first buffer occupancy update, which indicates a first amount of data waiting in a queue specific to the UE and the first cell; and
determining, using the second at least one processor, the second buffer occupancy update, which indicates a second amount of data waiting in a queue specific to the UE and the second cell.

12. The method of claim 10,
wherein the first at least one processor is implemented in a first at least one computing device;

wherein the second at least one processor is implemented in a second at least one computing device physically separate from the first at least one computing device; wherein the first at least one computing device and the second at least one computing device combine to implement the controller.

13. The method of claim 10, further comprising:
transmitting, from the at least one RU, to the UE from the first cell using a first carrier frequency; and
transmitting, from the at least one RU, to the UE from the second cell using a second carrier frequency.

14. The method of claim 10, wherein the first MAC scheduling and the second MAC scheduling are performed in parallel during at least partially overlapping time periods.

15. The method of claim 10, further comprising:
performing, using the first at least one processor, first MAC layer processing to produce first MAC PDUs from the first RLC PDUs; and
performing, using the second at least one processor, second MAC layer processing to produce second MAC PDUs from the second RLC PDUs.

16. The method of claim 10, further comprising:
fragmenting, using the first at least one processor, the first RLC PDUs, based on the first scheduling decision; and
fragmenting, using the first at least one processor, first MAC layer processing to produce first MAC PDUs from the fragmented first RLC PDUs.

17. The method of claim 10, further comprising:
fragmenting, using the first at least one processor, the second RLC PDUs, based on the second scheduling decision; and
fragmenting, using the first at least one processor, second MAC layer processing to produce second MAC PDUs from the fragmented second RLC PDUs.

18. The method of claim 10, further comprising:
initiating a first retransmission in response to receiving a first non-acknowledgement (NACK) from the UE regarding the first RLC PDUs; or
initiating a second retransmission in response to receiving a second non-acknowledgement (NACK) from the UE regarding the second RLC PDUs.

19. A base station, comprising:
at least one remote unit (RU) that exchanges radio frequency (RF) signals with a user equipment (UE) using an air interface; and
a controller communicatively coupled to the at least one RU, the controller configured to:
form, at an upper RLC entity, first RLC protocol data units (PDUs) for a first cell and second RLC PDUs for a second cell based on Radio Link Control (RLC) service data units (SDUs);
determine, by at least one lower RLC entity, at least one buffer occupancy update indicating a first amount of data waiting in a queue specific to the first cell and the UE and a second amount of data waiting in a queue specific to the second cell and the UE;
wherein a first at least one processor in the controller, implementing a first lower RLC entity, determines the first amount of data; and
wherein a second at least one processor in the controller, implementing a second lower RLC entity, determines the second amount of data;
wherein the base station performs Packet Data Convergence Protocol (PDCP) processing, comprising:
receiving Internet Protocol (IP) packets from an IP layer;
removing IP headers from the IP packets;

adding a PDCP header to form the RLC SDUs; and
sending the RLC SDUs to the controller.

20. The base station of claim 19, wherein the base station is a cloud radio access network (C-RAN), comprising:
the at least one RU;
at least one Distributed Unit (DU) communicatively coupled to the at least one RU via a front-haul network; and
a Central Unit (CU), wherein the controller is implemented in the DU or the CU.

21. The base station of claim 19, wherein the controller is further configured to:
perform, based on the at least one buffer occupancy update, first Medium Access Control (MAC) scheduling for the first cell to produce a first scheduling decision and second MAC scheduling for the second cell to produce a second scheduling decision.

22. The base station of claim 21,
wherein the first MAC scheduling is performed in a first at least one processor implementing a first per-cell MAC scheduler;
wherein the second MAC scheduling is performed in a second at least one processor implementing a second per-cell MAC scheduler.

23. The base station of claim 21, wherein the controller fragments at least one of the following:
the first RLC PDUs based on the first scheduling decision; and
the second RLC PDUs based on the second scheduling decision.

24. The base station of claim 19, wherein a first at least one processor in the controller further:
performs first MAC layer processing to produce first MAC PDUs based on the first RLC PDUs.

25. The base station of claim 19, wherein a second at least one processor in the controller further:
performs second MAC layer processing to produce second MAC PDUs based on the second RLC PDUs.

26. The base station of claim 19, wherein the controller further:
initiates a first retransmission in response to receiving a first non-acknowledgement (NACK) from the UE regarding the first RLC PDUs; or
initiates a second retransmission in response to receiving a second non-acknowledgement (NACK) from the UE regarding the second RLC PDUs.

27. A method performed by a controller in a base station comprising the controller and at least one remote unit (RU) that wirelessly communicates with a UE, the method comprising:
forming, at an upper RLC entity, first RLC protocol data units (PDUs) for a first cell and second RLC PDUs for a second cell based on Radio Link Control (RLC) service data units (SDUs);
determining, by at least one lower RLC entity, at least one buffer occupancy update indicating a first amount of data waiting in a queue specific to the first cell and the UE and a second amount of data waiting in a queue specific to the second cell and the UE;
wherein the first amount of data is determined using a first at least one processor in the controller that implements a first lower RLC entity; and
wherein the second amount of data is determined using a second at least one processor in the controller that implements a second lower RLC entity;
performing Packet Data Convergence Protocol (PDCP) processing, comprising:

receiving Internet Protocol (IP) packets from an IP layer;

removing IP headers from the IP packets;

adding a PDCP header to form the RLC SDUs; and
    sending the RLC SDUs to the controller.

28. The method of claim 27, wherein the base station is a cloud radio access network (C-RAN), comprising:

the at least one RU;

at least one Distributed Unit (DU) communicatively coupled to the at least one RU via a front-haul network; and a Central Unit (CU), wherein the controller is implemented in the DU or the CU.

29. The method of claim 27, further comprising:

performing, based on the at least one buffer occupancy update, first Medium Access Control (MAC) scheduling for the first cell to produce a first scheduling decision and second MAC scheduling for the second cell to produce a second scheduling decision.

30. The method of claim 29, further comprising:

performing the first MAC scheduling using a first at least one processor that implements a first per-cell MAC scheduler; and performing the second MAC scheduling in a second at least one processor that implements a second per-cell MAC scheduler.

31. The method of claim 29, further comprising fragmenting at least one of the following:

the first RLC PDUs based on the first scheduling decision; and the second RLC PDUs based on the second scheduling decision.

32. The method of claim 27, further comprising performing first MAC layer processing to produce first MAC PDUs based on the first RLC PDUs.

33. The method of claim 27, further comprising performing second MAC layer processing to produce second MAC PDUs based on the second RLC PDUs.

34. The method of claim 27, further comprising:

initiating a first retransmission in response to receiving a first non-acknowledgement (NACK) from the UE regarding the first RLC PDUs; or initiating a second retransmission in response to receiving a second non-acknowledgement (NACK) from the UE regarding the second RLC PDUs.

* * * * *